(12) United States Patent
Ka et al.

(10) Patent No.: US 10,152,088 B2
(45) Date of Patent: Dec. 11, 2018

(54) MOBILE TERMINAL AND CONTROL METHOD THEREFOR

(71) Applicant: LG ELECTRONICS INC., Seoul (KR)

(72) Inventors: Hokyung Ka, Seoul (KR); Chul Park, Seoul (KR); Jaedong Kim, Seoul (KR); Kyoungho Lee, Seoul (KR); Jinho Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 53 days.

(21) Appl. No.: 15/307,357

(22) PCT Filed: Apr. 30, 2015

(86) PCT No.: PCT/KR2015/004434
§ 371 (c)(1),
(2) Date: Oct. 27, 2016

(87) PCT Pub. No.: WO2015/167299
PCT Pub. Date: Nov. 5, 2015

(65) Prior Publication Data
US 2017/0045996 A1     Feb. 16, 2017

Related U.S. Application Data

(60) Provisional application No. 61/986,411, filed on Apr. 30, 2014.

(51) Int. Cl.
*G06F 3/041* (2006.01)
*G06F 3/0483* (2013.01)
(Continued)

(52) U.S. Cl.
CPC .......... *G06F 1/1652* (2013.01); *G06F 1/1616* (2013.01); *G06F 1/1641* (2013.01);
(Continued)

(58) Field of Classification Search
None
See application file for complete search history.

(56) References Cited

U.S. PATENT DOCUMENTS

| 2011/0209058 A1 | 8/2011 | Hinckley et al. |
| 2012/0084721 A1 | 4/2012 | Gimpl et al. |

(Continued)

FOREIGN PATENT DOCUMENTS

| JP | 2003015795 | 1/2003 |
| JP | 2007108441 | 4/2007 |

(Continued)

OTHER PUBLICATIONS

Korean Intellectual Property Office Application Serial No. 10-2015-0061486, Notice of Allowance dated Oct. 25, 2016, 2 pages.
PCT International Application No. PCT/KR2015/004434, International Search Report dated Aug. 12, 2015, 4 pages.

*Primary Examiner* — Joseph Haley
*Assistant Examiner* — Emily Frank
(74) *Attorney, Agent, or Firm* — Lee, Hong, Degerman, Kang & Waimey

(57) ABSTRACT

The present invention relates to a mobile terminal and a control method therefor, the mobile terminal comprising: a terminal body; a display unit disposed on a front side and comprising a first part, and a second part formed so as to be rotatable about a boundary part on one side of the first part, thereby being in either a first-part covering state or a first-part not-covering state; and a control unit controlling the display unit so that at least one page among a plurality of pages in an electronic document can be outputted, detecting the bending of the display unit by the movement of at least one of the left-end and right-end, selecting, on the basis of the detected bending, at least one page among the plurality of pages, and controlling the display unit so that the selected page is outputted.

20 Claims, 22 Drawing Sheets

(51) Int. Cl.
*G06F 1/16* (2006.01)
*G06F 3/0488* (2013.01)
*G06F 3/14* (2006.01)
*G06F 3/16* (2006.01)
*G09G 3/20* (2006.01)
*H04M 1/02* (2006.01)

(52) U.S. Cl.
CPC .......... *G06F 1/1677* (2013.01); *G06F 1/1686* (2013.01); *G06F 1/1688* (2013.01); *G06F 1/1694* (2013.01); *G06F 3/0412* (2013.01); *G06F 3/0416* (2013.01); *G06F 3/0483* (2013.01); *G06F 3/04883* (2013.01); *G06F 3/1423* (2013.01); *G06F 3/165* (2013.01); *G09G 3/20* (2013.01); *G09G 3/2003* (2013.01); *H04M 1/0268* (2013.01); *G06F 2203/04101* (2013.01); *G06F 2203/04102* (2013.01); *G06F 2203/04105* (2013.01); *G09G 2300/023* (2013.01); *G09G 2370/10* (2013.01); *G09G 2370/16* (2013.01); *G09G 2380/02* (2013.01)

(56) References Cited

U.S. PATENT DOCUMENTS

| | | | | |
|---|---|---|---|---|
| 2012/0304053 | A1* | 11/2012 | Yamaguchi | G06F 1/1677 715/251 |
| 2013/0021281 | A1* | 1/2013 | Tse | G06F 3/0425 345/173 |
| 2013/0268847 | A1* | 10/2013 | Kim | G06F 3/0488 715/251 |
| 2014/0028597 | A1* | 1/2014 | Cho | G06F 3/0487 345/173 |
| 2015/0242061 | A1* | 8/2015 | Patel | G06F 3/017 715/765 |
| 2015/0253883 | A1* | 9/2015 | Takano | G06F 3/0485 345/173 |

FOREIGN PATENT DOCUMENTS

| | | |
|---|---|---|
| JP | 2010157060 | 7/2010 |
| KR | 10-2010-0065418 | 6/2010 |
| KR | 10-2010-0128781 | 12/2010 |
| WO | 2012-108668 | 8/2012 |
| WO | 2013-154275 | 10/2013 |

* cited by examiner

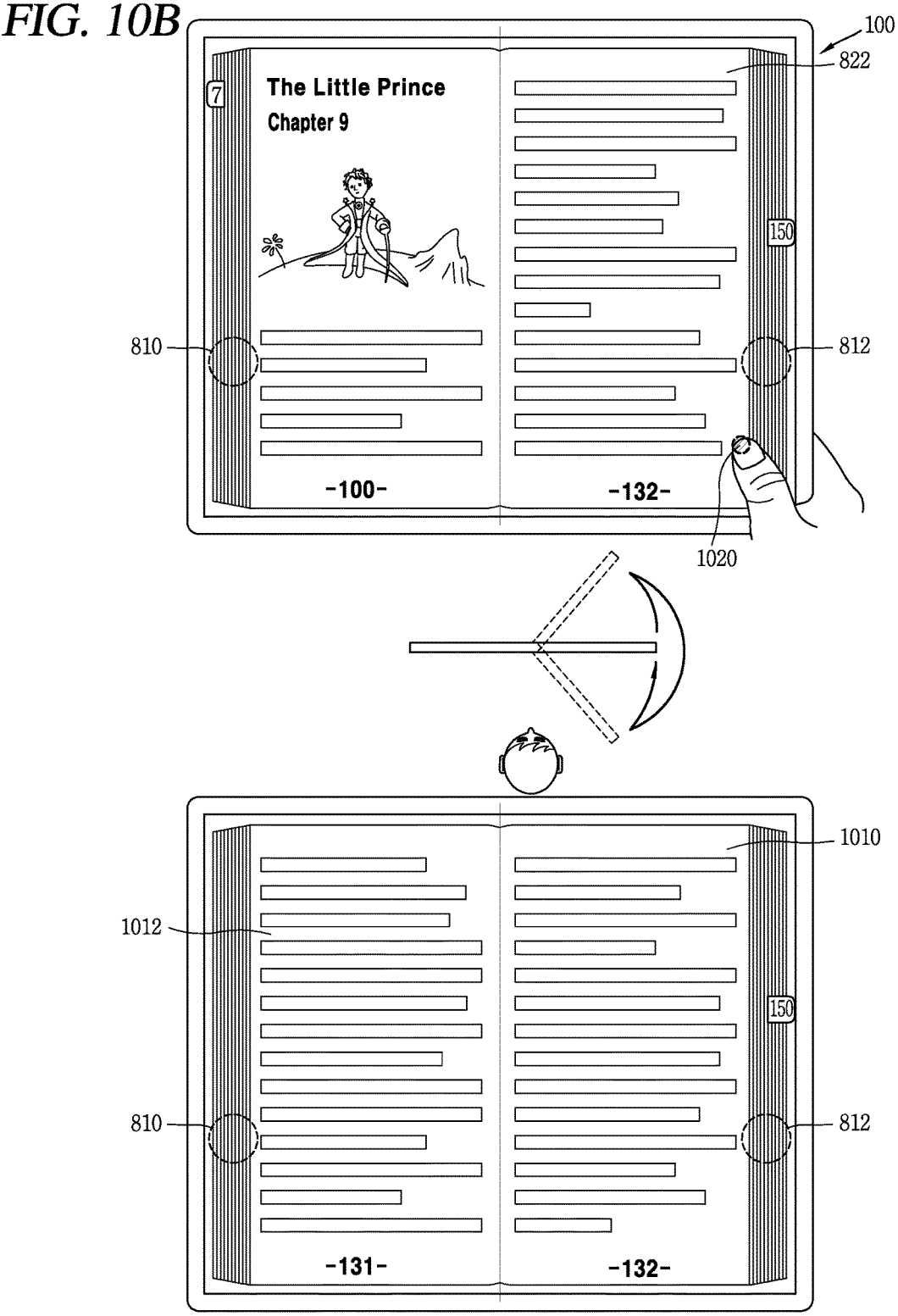

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2015/004434, filed on Apr. 30, 2015, which claims the benefit of U.S. Provisional Application No. 61/986,411, filed on Apr. 30, 2014, the contents of which are all hereby incorporated by reference herein in their entirety.

BACKGROUND OF THE INVENTION

1. Field of the Invention

The present disclosure relates to a mobile terminal having a flexible display and a control method thereof.

2. Description of the Related Art

Mobile terminals may include all types of devices configured to have a battery and a display unit 151, and display information on the display unit 151 using power supplied from the battery, and formed to allow a user to hand-carry it. The mobile terminal may include a device configured to record and play a video and a device configured to display a graphic user interface (GUI), and may include a laptop computer, a portable phone, glasses, a watch, a game machine, and the like capable of displaying screen information.

As it becomes multifunctional, a mobile terminal can be allowed to capture still images or moving images, play music or video files, play games, receive broadcast and the like, so as to be implemented as an integrated multimedia player. Moreover, efforts are ongoing to support and increase the functionality of mobile terminals. Such efforts include software and hardware improvements, as well as changes and improvements in the structural components.

Such a terminal has been evolved into various types of designs, and efforts for developing a newer type of mobile terminal have been carried out in order to meet the needs of a user who wants newer and various types of designs. A new type may include structural changes and improvements for allowing a user to use a mobile terminal in a more convenient manner. As one of such structural changes and improvements, a mobile terminal in which at least part of the display unit is flexible or bendable has been drawn attention.

In this manner, as such a mobile terminal in which at least part of the display unit is flexible or bendable has been drawn attention, the need of a user-friendly user interface using such characteristics has been on the rise. In other words, due to the characteristics of a flexible or bendable mobile terminal, the creation of a new user interface can be made for its application that has been previously restricted or impossible.

SUMMARY OF THE INVENTION

An object of the present disclosure is to solve the foregoing and other problems.

Another object of the present disclosure is to provide a mobile terminal having a new type of body using the characteristics of a flexible display unit capable of flexing or bending, and a control method thereof.

Still another object of the present disclosure is to provide a mobile terminal for accurately sensing a change due to the flexing of a flexible display unit, and performing various functions based on the sensed change, and a control method thereof.

Yet still another object of the present disclosure is to provide a mobile terminal for performing a function associated with content displayed on a flexible display unit in response to the flexing of the flexible display unit, and a control method thereof.

Furthermore, the present disclosure may provide a mobile terminal for allowing a display unit that forms a single plane to be bent and modified to allow different portions of the display unit to overlap with each other and accurately sensing a degree of bending and a bending speed, and a control method thereof.

In order to accomplish the tasks, a mobile terminal system according to an aspect of the present disclosure may include a terminal body provided with a front surface, a lateral surface and a rear surface, and formed such that at least part thereof is foldable, a display unit disposed on the front surface, the display unit comprising a first portion; and a second portion formed in a rotatable manner with respect to one boundary portion formed at one side of the first portion to be in either one of a state that covers the first portion and a state that does not cover the first portion, a first sensing unit disposed at a left end of the terminal body to generate a first signal based on the movement of the left end, a second sensing unit disposed at a right end of the terminal body to generate a second signal based on the movement of the right end, and a controller configured to control the display unit to display at least one page of a plurality of pages constituting an electronic document, and sense the flexing of the display unit due to the movement of at least one of the left and the right end based on the first and the second signal, and select at least one page of the plurality of pages based on the sensed flexing, and control the display unit to display the selected page.

According to an embodiment, the controller may select a different page based on an included angle formed by the first and the second portion in selecting at least one page among the plurality of pages.

According to an embodiment, when the display unit is flexed inward by relatively moving the right end with respect to the left end while displaying an n-th page among the plurality of pages, the controller may set "t" based on the included angle, and control the display unit to display an (n+t)th page instead of the n-th page, wherein the "n" and the "t" are natural numbers, and the "t" varies according to the included angle.

According to an embodiment, when the display unit is flexed inward by relatively moving the left end with respect to the right end while displaying the n-th page, the controller may control the display unit to display an (n−t)th page instead of the n-th page.

According to an embodiment, when a preset touch input is applied to the display unit while the flexing is sensed, the controller may restrict the selected page from being displayed.

According to an embodiment, when the display unit is flexed inward by relatively moving the right end with respect to the left end, the controller may display a subsequent next page in replacement of a current page being displayed to carry out page movement.

According to an embodiment, the controller may consecutively perform the page movement while the flexing is maintained.

According to an embodiment, a speed of carrying out the page movement may vary according to an included angle formed by the first portion and the second portion.

According to an embodiment, when the display unit is switched to a flat plane while carrying out the page movement by the flexing, the controller may stop the page movement.

According to an embodiment, when the display unit is flexed outward by the movement of the right and the left end, the controller may set a bookmark for the current page.

According to an embodiment, when the bookmark is set, the controller may display a bar-shaped image formed in an elongated manner along a lateral surface of the terminal body on an edge of the current page, and display information associated with a page to which the bookmark is set on the image.

According to an embodiment, when the first portion and the second portion overlap with each other, the controller may end the output of the at least one page, and switch the display unit from an ON state to an OFF state.

According to an embodiment, a first geomagnetic sensor and a second geomagnetic sensor configured to sense whether or not the first portion and the second portion may overlap with each other, and the first and the second geomagnetic sensor may be disposed at the left and the right end, respectively.

In addition, a control method of a mobile terminal according to an embodiment of the present disclosure may include controlling a display unit to display at least one page among a plurality of pages constituting an electronic document, sensing the flexing of the display unit due to the movement of at least one of a left end and a right end of the display unit, wherein the flexing of the display unit is sensed by a first signal generated from a first sensing unit disposed at the left end and a second signal generated from a second sensing unit disposed at the right end, and selecting at least one page of the plurality of pages based on the sensed flexing, and controlling the display unit to display the selected page.

According to an embodiment, the display unit may include a first portion; and a second portion formed in a rotatable manner with respect to one boundary portion formed at one side of the first portion to be in either one of a state that covers the first portion and a state that does not cover the first portion, wherein said controlling the display unit to display the selected page includes measuring an included angle formed by the first portion and the second portion, setting "t" based on the included angle, and controlling the display unit to display an (n+t)th page instead of an n-th page being displayed, wherein the "n" and the "t" are natural numbers, and the "t" varies according to the included angle.

According to an embodiment, said controlling the display unit to display the selected page may include displaying a subsequent next page in replacement of a current page being displayed to carry out page movement when the display unit is flexed inward by relatively moving the right end with respect to the left end.

According to an embodiment, the method of the mobile terminal may further include consecutively performing the page movement while the flexing is maintained.

According to an example associated with the present disclosure, a speed of carrying out the page movement may vary according to an included angle formed by the first portion and the second portion.

According to an embodiment, the method of the mobile terminal may further include stopping the page movement when the display unit is switched to a flat plane while carrying out the page movement by the flexing.

The effects of a mobile terminal and a control method thereof according to an embodiment of the present disclosure will be described as follows.

According to at least one of the embodiments of the present disclosure, a first and a second sensing unit may be disposed at one end and the other end of the body to generate a first signal corresponding to the movement of said one end and a second signal corresponding to the movement of the other end, and the mobile terminal may accurately measure a bending degree and a bending speed of the display unit using the first and the second signal.

A first portion and a second portion of the display unit may be bent based on one boundary portion, and an additional device configured to sense a curvature may not be mounted at said one boundary portion, thereby providing a design advantage. Specifically, a display unit formed of a single flat plane may be provided, and the display unit may be bent in a more flexible manner such that the first and the second portion overlap with each other based on the one boundary portion.

Furthermore, according to at least one of the embodiments of the present disclosure, when an electronic book configured with a plurality of pages or a photo album configured with a plurality of images is displayed on a flexible display unit, a user may apply an external force to the flexible display unit to be flexed, thereby turning a page being displayed on the flexible display unit to a next page or previous page. Through this, the user may have a user experience for turning pages on a book. Furthermore, it may not be required for the user to apply an additional touch input for turning pages while holding a mobile terminal on his or her hand, thereby enhancing user convenience.

A mobile terminal according to the present disclosure may accurately measure a bending degree and a bending speed of the flexible display unit, and adjust a number of turned pages to be different based on the measured information. Accordingly, the user may more precisely control the mobile terminal, thereby accurately searching pages.

Further scope of applicability of the present invention will become apparent from the detailed description given hereinafter. However, it should be understood that the detailed description and specific examples such as preferred embodiments of the invention are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 10A and 10B are exemplary views for explaining page movement associated with a bookmark.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1:
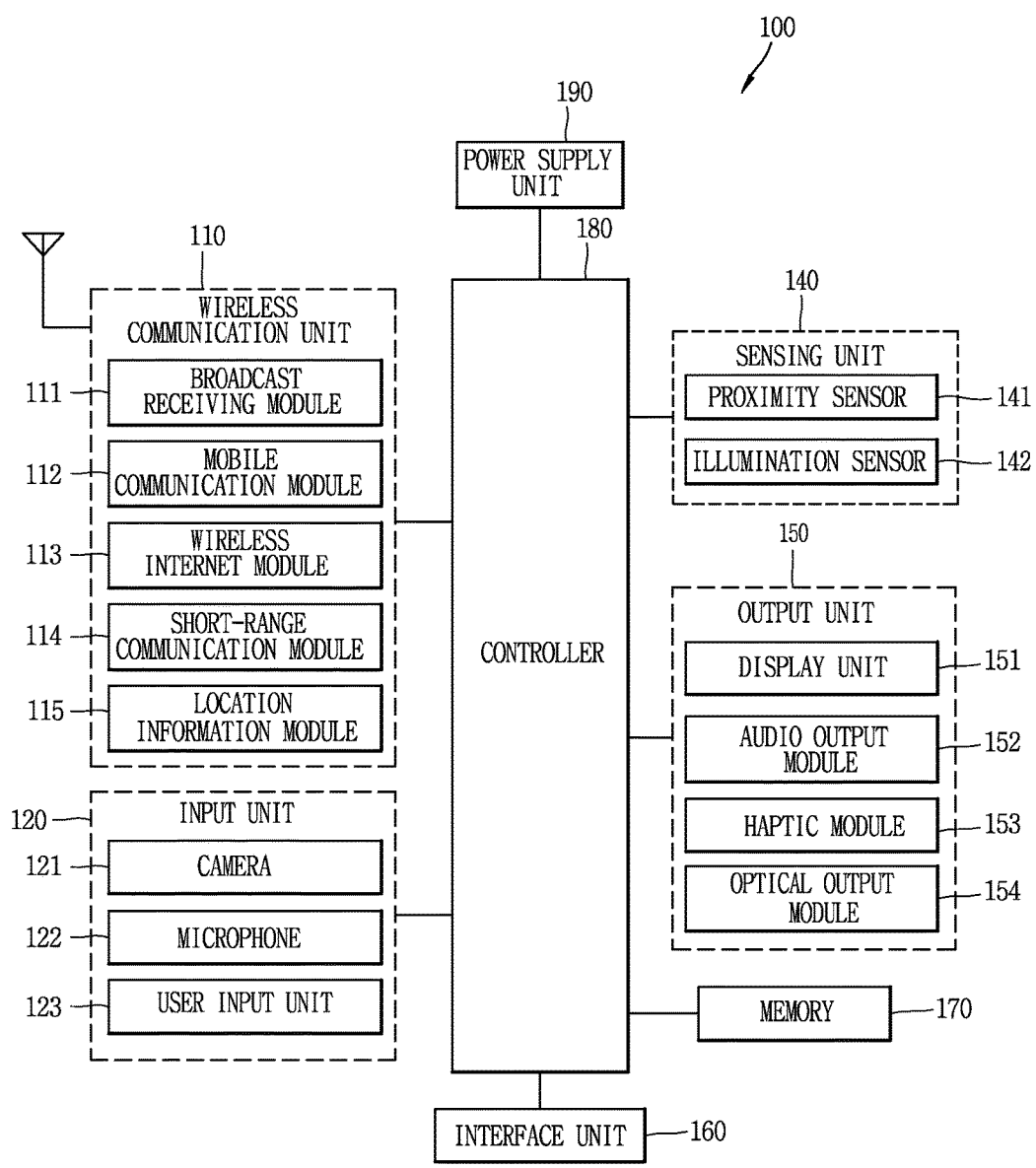
FIG. 1 is a block diagram for explaining a mobile terminal associated with the present disclosure.

FIG. 1 is a block diagram for explaining a mobile terminal associated with the present disclosure.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

An electromagnetic generator 130 generates electromagnetic waves having linearity as a trigger signal for controlling an external device located at a near distance. More specifically, the electromagnetic generator 130 generates electromagnetic waves having a specific frequency by the control of the controller 180. In other words, electromagnetic waves generated by the electromagnetic generator 130 may have various frequencies according to the control of the controller 180. Meanwhile, the electromagnetic waves may include various data according to the control of the controller 180. More specifically, the electromagnetic waves may include a request message for requesting information associated with an external device or an identify factor for security.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output unit 152, a haptic module 153, an optical output unit 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

Furthermore, the display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

On the other hand, the touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

As described above, the display unit 151 may form a touch screen together with the touch sensor. Here, the touch screen may serve as the user input unit 123 (see FIG. 1A). Therefore, the touch screen may replace at least some of functions of the first manipulation unit 123a.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.)

The wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, smart glasses or a head mounted display (HMD), which is able to exchange data with the mobile terminal 100 (or to like data with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

On the other hand, for the sake of brief explanation, a state that the pointer is positioned to be proximate onto the touch screen without contact will be referred to as 'proximity touch,' whereas a state that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors as described above, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

On the other hand, the touch sensor may be formed to sense a touch input using a different scheme in an active or inactive state of the display unit 151. At this time, the different scheme may be associated with an active period of the touch sensor. More specifically, the touch sensor may be activated with a different period according to whether or not the display unit 151 is activated. In other words, the touch sensor may have a different active period according to whether or not the display unit 151 is activated to sense a touch input applied to the touch sensor.

For example, when the display unit 151 is in an inactive state, the touch sensor may be activated with a preset specific period. In this case, the specific period may be a period corresponding to a time greater than zero. Furthermore, when the display unit 151 is in an active state, the touch sensor may be always operated in an active state. In other words, in this case, an activated period of the touch sensor may be a period having a time zero or very close to zero.

Whether or not the touch sensor is activated may be determined using the power consumption of the touch sensor. For example, the touch sensor may correspond to an inactive state when the power consumption of the touch sensor is less than a preset reference value based on zero, and may be referred to as an active state when the power consumption of the touch sensor is greater than a preset reference value based on zero.

When the display unit 151 is in an active state (hereinafter, referred to as an "active mode"), the touch sensor may continuously maintain the active state, and wait form the application of a touch input to the display unit 151. On the contrary, when the display unit 151 is in an inactive state (hereinafter, referred to as a "doze mode"), the touch sensor may be activated for each a preset specific period.

On the other hand, as reducing a specific period in which the touch sensor is activated, a speed for sensing a touch input hitting the display unit 151 may increase, but accordingly power consumed by the touch sensor may also increase. On the contrary, as increasing the period in which the touch sensor is activated, a speed for sensing a touch input hitting the display unit 151 may decrease though power consumed by the touch sensor decreases.

Accordingly, the specific period may be set to enhance the efficiency of power consumption while the sensing speed is fast enough to the extent that cannot be recognized by the user in sensing a touch input hitting the display unit 151. For example, the specific period may be set such that the touch sensor is inactive and then active 20 times (Hz) per second.

On the other hand, while the display unit 151 is in an active state, the touch sensor may be also activated, and the active period (T) in an active state may be zero or very close to zero. Otherwise, the period of the touch sensor while the touch sensor is in an active state may be shorter several times than a specific period set to activate the touch sensor while the display unit 151 is in an inactive state.

On the other hand, when a preset touch input (for example, a first and a second touch input consecutively hitting a predetermined region within a reference period of time) is sensed by the touch sensor in a doze mode in which the display unit 151 is deactivated and the touch sensor is periodically activated, the controller 180 may switch the doze mode to an active mode in which the display unit and touch sensor are activated.

In addition, the touch sensor may be driven with a different period based on the state of the display unit 151. For example, the touch sensor may execute a doze mode when the display unit 151 is in a closed state, and execute an active mode when switching from the closed state to an open state.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

On the other hand, the camera 121 may include at least one of a first camera 121a formed on a front surface of the terminal body and a second camera 121b formed on a rear surface thereof.

The first camera 121a may process video frames such as still or moving images obtained by the image sensor in a video call mode or a capture mode. The processed video frames may be displayed on the display unit 151 or stored in the memory 170.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

Furthermore, the electromagnetic generator (not shown) may be disposed adjacent to the second camera 121b. The electromagnetic generator (not shown) radiates the generated electromagnetic waves when the second camera 121b is activated.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output unit 152 may output audio data received from the wireless communication unit 110 or stored in the memory 160 in a call signal reception mode, a call mode, a record mode, a voice recognition mode, a broadcast reception mode, and the like. Also, the audio output unit 152 may also provide audible output signals related to a particular function (e.g., a call signal reception sound, a message reception sound, etc.) performed by the mobile terminal 100. The audio output unit 152 may include a receiver, a speaker, a buzzer or the like.

The audio output unit 152 may include at least one of a first audio output unit 152a and a second audio output unit 152b. The first audio output unit 152a may be implemented in the form of a receiver for transferring a telephone call sound to the user's ear or a loud speaker for outputting various alarm sounds or reproduced sounds of the multimedia.

A haptic module 153 may generate various tactile effects that can be felt by a user. A representative example of tactile effect generated by the haptic module 153 may be vibration. The intensity, pattern and the like of vibration generated by the haptic module 153 may be controlled by a user's selection or the settings of the controller. For example, the haptic module 153 may output different vibrations in a combined manner or in a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output unit 154 may output a signal for indicating an event generation using light of a light source. Examples of events generated in the mobile terminal 100 may include a message reception, a call signal reception, a missed call, an alarm, a schedule notice, an email reception, an information reception through an application, and the like. When a user's event check is sensed, the controller 180 may control the optical output unit 154 to end the output of light.

A signal output by the optical output unit 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

On the other hand, various embodiments described herein may be implemented in a computer-readable or its similar medium using, for example, software, hardware, or any combination thereof.

FIGS. 2A through 2E are conceptual views illustrating an example in which a mobile terminal associated with the present disclosure is seen from different directions.

Figure 2A:
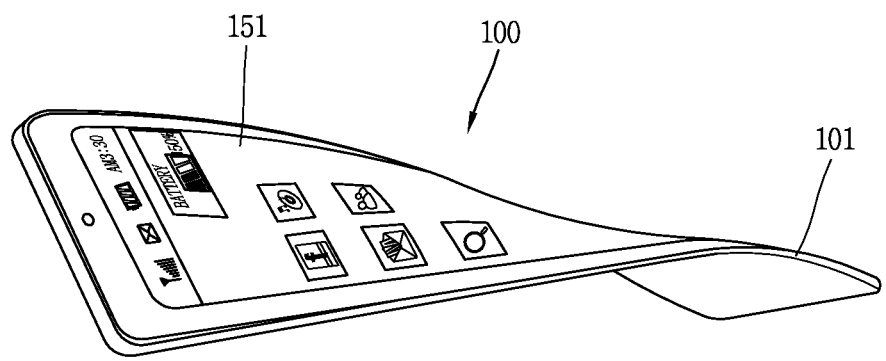
FIGS. 2A through 2E are conceptual views illustrating an example in which a mobile terminal associated with the present disclosure is seen from different directions.

Referring to FIG. 2A, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case 101 may be divided into a front case and a rear case. Various electronic components may be incorporated into a space formed between the front case and the rear case. At least one middle case may be additionally disposed between the front case and the rear case.

The case 101 may be configured to be deformable along with the flexible display unit 151 by an external force in consideration of the characteristics of the flexible display unit 151 in which at least part thereof is formed to be flexible to allow foldability. In other words, the flexible display unit 151 may be formed to be bent or folded along with the case 101.

For example, the case 101 may be formed of deformable materials such as plastics, thin glasses, fibrous components, thin metals (for example, aluminum, etc.), or a combination of those materials.

On the other hand, part of the case 101 may be formed of a dielectric or low conductive material, and the case 101 or at least part of the structure constituting the case 101 may be formed of a metallic element.

The display unit 151 may be disposed on a front surface of the mobile terminal body to display information. As illustrated in the drawing, the display unit 151 may be mounted on the case 101 to form a front surface of the mobile terminal body.

According to circumstances, electronic components may be mounted on the rear case. The electronic components that can be mounted on the rear case may include a detachable battery, an identification module, a memory card, and the like. In this case, a rear cover for covering electronic components mounted thereon may be combined with the rear case in a detachable manner. Accordingly, when the rear cover is separated from the rear case, electronic components mounted on the rear case may be exposed to the outside. Meanwhile, an opening portion for exposing the camera or audio output unit to the outside may be provided in the rear cover.

Contrary to the foregoing example in which a plurality of cases are provided to accommodate various electronic components, one case may be configured to provide the inner space. In this case, the mobile terminal 100 with a unibody in which synthetic resin or metal is extended from a lateral surface to a rear surface may be implemented.

On the other hand, the mobile terminal 100 may include a waterproof portion (not shown) through which water is not infiltrated into the mobile terminal body. For example, the waterproof portion may be provided between the front case and the rear case or between the rear case and the rear cover to include a waterproof member for sealing the inner space while combining them together.

The mobile terminal 100 may include a display unit 151, an audio output unit 152, an optical output unit 154, a second camera 121, a microphone 122, and the like.

Figure 2B:
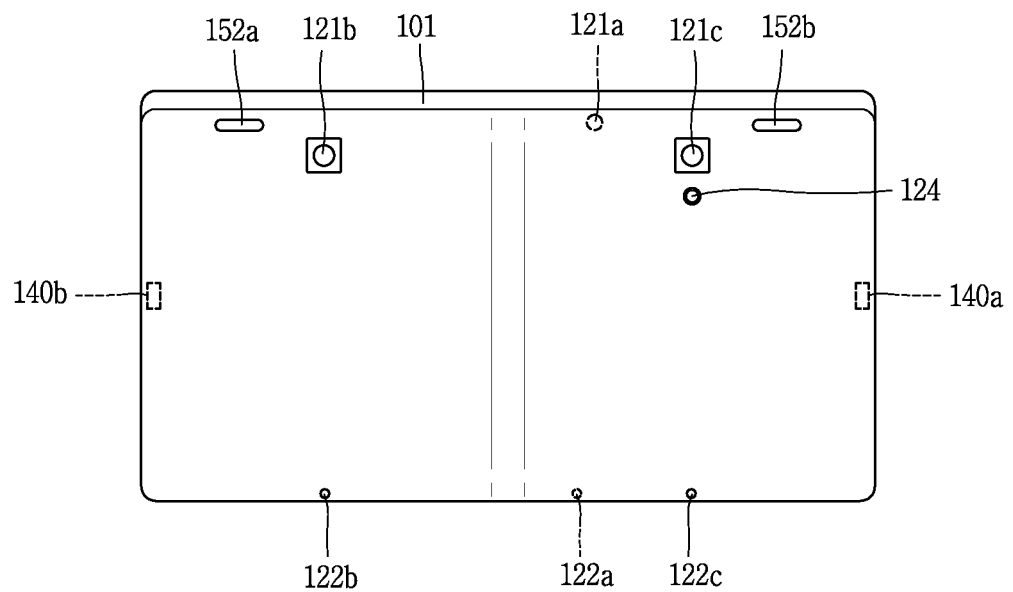

Hereinafter, as illustrated in FIGS. 2A and 2B, a mobile terminal 100 in which the display unit 151 is disposed on the front surface of the body of the mobile terminal, and the camera 121, the audio output unit 152, the microphone 122 and the rear input unit 123a, 123b, the optical output unit 154 are disposed on a rear surface of the body of the mobile terminal will be described as an example. However, the foregoing configuration may not be necessarily limited to the arrangement. The foregoing configuration may be excluded, substituted or disposed on another surface if necessary.

As illustrated in FIG. 2A, the display unit 151 may be disposed on a front surface of the mobile terminal 100. The display unit 151 displays (outputs) information processed by the mobile terminal 100. For example, the display unit 151 may display an execution screen information of an application program driven by the mobile terminal 100 or user interface (UI) or graphic user interface (GUI) information based on the execution screen information.

The display unit 151 may include at least one of a liquid crystal display (LCD), a thin film transistor-liquid crystal display (TFT LCD), an organic light emitting diode (OLED), a three-dimensional (3D) display, and an e-ink display.

On the other hand, the display unit 151 may be deformable by an external force. The deformation may be at least one of curving, bending, folding, twisting and rolling of the display unit 151. Such a deformable display unit 151 may be referred to as a "flexible display unit" or "bendable display unit." Here, the flexible display unit may include both a general flexible display and an e-paper. In other words, a flexible display unit denotes a display unit in which at least part thereof is formed in a flexible manner to allow folding.

The general flexible display denotes a light, non-fragile display, which still exhibits characteristics of the conventional flat panel display and is fabricated on a flexible substrate which can be curved, bent, folded, twisted or rolled.

Furthermore, the e-paper is a display technology employing the characteristic of a general ink, and is different from the conventional flat panel display in view of using reflected light. The e-paper may change information by using a twist ball or an electrophoresis using a capsule.

In a state that the display unit 151 is not deformed (for example, in a state with an infinite radius of curvature, hereinafter, referred to as a first state), a display region of the display unit 151 may become a flat surface. In a state that the display unit is deformed from the first state by an external force (for example, a state with a finite radius of curvature, hereinafter, referred to as a second state), the display region may become a curved surface (or a bent surface). As illustrated, information displayed in the second state, may be visual information output on the curved surface. The visual information may be realized in such a manner that a light emission of each unit pixel (sub-pixel) arranged in a matrix configuration is controlled independently. The unit pixel denotes an elementary unit for representing one color.

The display unit 151 may be placed in a curved state (for example, a state of being curved from up to down or from right to left), other than a plane state, in the first state. In this case, when an external force is applied to the display unit 151, the display unit 151 may be deformed back into the plane state or into a more curved state.

The display unit 151 may be formed of materials with several layers. For example, the display unit 151 may implement a touch screen by a combination with a touch sensor. When a touch is input onto the touch screen, the controller 180 (see FIG. 1A) may execute a control corresponding to the touch input. The touch screen may be configured to sense a touch input even in the second state as well as in the first state. The touch sensor may be disposed on a substrate of the display or provided within the display.

In this manner, the display unit 151 may form a flexible touch screen along with the touch sensor, and in this case, the touch screen may function as the user input unit 123 (refer to FIG. 1A).

On the other hand, the state deformation of the display unit 151 may not be necessarily limited to an external force. For example, when the display unit 151 is in a non-deformed state, it may be deformed to a deformed state by a user or application's command. More specifically, the mobile terminal 100 may include a drive unit (not shown), and may be deformed from a non-deformed state to a deformed state by driving the drive unit other than the external force when corresponding to a preset condition.

The mobile terminal 100 according to an embodiment of the present disclosure may include a deformation sensor which senses the deformation of the flexible display unit 151. The deformation sensor may be included in the sensing unit 140 (see FIG. 1A).

The deformation sensor may be disposed in the display unit 151 or a case 101 to sense information related to the deformation of the display unit 151. For example, the deformation sensor may include a first sensing unit 140a disposed at a left end of the body and a second sensing unit 140b disposed at a right end of the body. The first sensing unit 140a may generate a first signal corresponding to the movement of the left end, and the second sensing unit 140b may generate a second signal corresponding to the movement of the right end. The deformation sensor or controller 180 may sense information associated with the deformation of the display unit 151.

Here, the information associated with deformation may be a deformed direction, a deformed degree, a deformed position, a deformed time, an acceleration that the deformed display unit 151 is restored, and the like, and in addition, may be various information which is sensible due to the bending of the display unit 151.

Furthermore, the controller 180 may change information displayed on the display unit 151 or generate a control signal for controlling the function of the mobile terminal 100 based on information associated with the deformation of the display unit 151 sensed by the deformation sensor.

For example, when the display unit 151 is bent in response to an external physical force, the controller 180 may rearrange, separate, combine or change screen images previously displayed on the display unit 151 according to a bent direction, a bent angle or a return acceleration for returning to an original state. More specifically, when the display unit 151 is bent in an inward direction due to an external physical force, the controller 180 may display screen images displayed on the display unit 151 to be close to each other. Furthermore, on the contrary, when the display unit 151 is bent in an outward direction due to an external physical force, screen images displayed on the display unit 151 may be displayed to be separated from each other.

The deformation sensor will be described below in detail with reference to FIGS. 3A through 5C.

On the other hand, the mobile terminal 100 according to the modified example may include a case 201 for accommodating the display unit 151. The case 101 may be configured to be deformable along with the display unit 151 by an external force in consideration of the characteristics of the display unit 151. In other words, the display unit 151 may be formed to be bent along with the case 101.

For example, the case 101 may be formed of deformable materials such as plastics, thin glasses, fibrous components, thin metals (for example, aluminum, etc.), or a combination of those materials.

On the other hand, part of the case 101 may be formed of a dielectric or low conductive material, and the case 101 or at least part of the structure constituting the case 101 may be formed of a metallic element.

Though not shown in the drawing, a user input unit 123 may be provided on a rear surface of the case 101. The user input unit 123 are manipulated to enter a communication for controlling the operation of the mobile terminal 100, and the content being entered may be set in various ways. For example, commands such as power on/off, start, end, scroll, and the like, commands such as adjustment of audio volume output from the audio output unit 152, switching to a touch recognition mode of the display unit 151, and the like may be entered. The rear input unit may be implemented in the form of allowing a touch input, a push input or a combination thereof.

The user input unit 123 unit may be disposed to overlap the display unit 151 on the front surface thereof in a thickness direction of the mobile terminal body. Furthermore the user input unit 123 may be disposed at a location adjacent to both left and right ends of the case 101. As a result, the user input unit 123 may be located on a rear surface of the mobile terminal 100 in a planar state in which the case 101 is not bent, and located on a front surface of the mobile terminal 100 when both the left and right ends of the case 101 are bent to face each other. However, the present disclosure may not be necessarily limited to this, and the location and number of the rear input unit can be changed.

On the other hand, the mobile terminal 100 may include a fingerprint recognition sensor for recognizing a user's fingerprint, and the controller 180 may use fingerprint information sensed through the finger recognition sensor as an authentication means. The finger recognition sensor may be integrated into the display unit 151 or user input unit 123.

The microphone 122 may be configured to enter the user's voice, other sounds, and the like. The microphone 122 may be provided at a plurality of positions to receive stereo sounds.

One or more rear cameras 121b, 121c may be disposed on a rear surface of the mobile terminal body. When a front camera 121a is disposed on a front surface of the body of the mobile terminal, the one or more rear cameras 121b, 121c may have a capture direction substantially opposite to the front camera 121a.

The front camera 121a may be disposed at an opening portion formed on part of the display unit 151. Otherwise, the front camera 121a may be disposed at an opening portion formed on part of the case disposed on a front surface thereof.

The one or more rear cameras 121b, 121c process the image frames of still images or video obtained by the image sensor in a capture mode or video call mode. The processed image frames may be displayed on the display unit 151, and stored in the memory 170.

The one or more rear cameras 121b, 121c may include a plurality of lenses arranged along at least one line. The plurality of lenses may also be arranged in a matrix configuration. The cameras may be referred to as an "array camera." When the camera 121 is implemented as the array camera, images may be captured in various manners using the plurality of lenses and images with better qualities may be obtained.

A flash 124 may be disposed adjacent to the one or more rear cameras 121b, 121c. When a subject is captured with the rear camera, the flash 124 may illuminate light toward the subject.

Though not shown in the drawing, the electromagnetic generator (not shown) may be disposed adjacent to the rear camera. The electromagnetic generator radiates the generated electromagnetic waves when the rear camera is activated.

At least one antenna for wireless communication may be provided in the body of the mobile terminal 100. The antenna may be integrated into the body of the mobile terminal or formed on the case. For example, the antenna constituting the broadcast receiving module 111 (refer to FIG. 1) may be configured to be retractable from the body of the mobile terminal. Otherwise, the antenna may be formed in a film type and adhered to an inner surface of the rear cover, and a case containing a conductive material may be configured to function as an antenna.

The optical output unit 154 may be configured to output light for indicating an event generation. Examples of the event may include a message reception, a call signal reception, a missed call, an alarm, a schedule notice, an email reception, information reception through an application, and the like. When a user's event checking is sensed, the controller may control the optical output unit 154 to stop the output of the light.

Moreover, a battery (not shown) provided in the mobile terminal 100 may be also configured to be deformed along with the display unit 151 by an external force in consideration of the characteristics of the display unit 151. A stack and folding method for stacking up battery cells may be applicable to implement the battery.

Though not shown in the drawing, the input unit 160 (refer to FIG. 1) may be disposed on a lateral surface of the body of the mobile terminal. The interface unit 160 serves as a path allowing the mobile terminal 100 to exchange data with an external device. For example, the interface unit 160 may be at least one of a connection terminal for connecting to an external device (for example, an earphone, an external speaker), a port for near field communication (for example, an Infrared Data Association (IrDA) port, a Bluetooth port, a wireless LAN port, etc.), and a power supply terminal for supplying power to the mobile terminal 100. The interface unit 160 may be implemented in the form of a socket for accommodating an external card such as Subscriber Identification Module (SIM) or User Identity Module (UIM), and a memory card for information storage.

The battery (not shown) may be configured to receive power via a power cable connected to the interface unit 160. Furthermore, the battery may be configured to allow wireless charging via a wireless charger. The wireless charging may be implemented by a magnetic induction or resonance (magnetic resonance) scheme.

In the mobile terminal 100 according to an embodiment of the present disclosure capable of including at least one of the foregoing constituent elements, the controller 180 may determine the state of the display unit 151 in response to the flexing of the display unit, and sense the switching of the state of the display unit 151. Furthermore, the controller 180 may control information displayed on the display unit 151 in response to the switching of the state of the display unit 151. Accordingly, information displayed on the display unit is determined by the state of the display unit 151.

Hereinafter, a method of controlling information displayed on the display unit 151 in connection with the structure of the display unit 151 and the bending of the display unit 151 will be described in more detail with reference to the accompanying drawings.

First, the structural characteristics of the display unit 151 in a mobile terminal according to an embodiment of the present disclosure will be described.

Referring to the present drawings, the mobile terminal 100 may include a case 101 constituting the appearance thereof, a display unit 151 disposed on a front surface thereof, and a first and a second sensing unit 140a, 140b configured to sense the deformation of the display unit 151.

The display unit 151 in which at least part thereof is formed to be flexible to allow foldability may be formed in a bendable or foldable manner.

Here, folding denotes a state in which a partial curvature radius of the mobile terminal body is maintained to be less than a reference value, and corresponds to a folded state in plain language. In case of folding, the screens of the display unit may be brought into contact to face each other or located close to each other.

On the contrary, bending denotes a state in which a partial curvature radius of the mobile terminal body is maintained to be greater than a reference value, and corresponds to a bent state in plain language.

Furthermore, folding and bending may be determined by the extent of being bent. For example, being bent at an angle greater than a predetermined angle may be defined as folding, and being bent at an angle equal to or less than the predetermined angle may be defined as bending. Furthermore, when the curvature radius is greater than the reference value even though bent at an angle greater than a predetermined angle may be defined as bending.

However, hereinafter, both bending and folding will be commonly referred to as bending.

The body of the mobile terminal, namely, at least one of the display unit 151 and the case 101 may include at least one bending region 210, and may be bent while being rotated around an axis of the bending region 210. For example, the left end of the mobile terminal may be rotated to be bent or deformed in a first arrow direction 200a around an axis of the bending region 210. For another example, the right end may be rotated to be bent or deformed.

The bending region 210 may be defined as a virtual vertical line and/or horizontal line connecting points at which a resistance value larger than a reference resistance value among points at which bending has occurred.

Such a bending region may be preset to a predetermined region on the entire region of the body of the mobile terminal. In other words, a user may bend the body of the mobile terminal around an axis of the preset bending region.

The bending region may be a display region disposed between a first portion (A) and a second portion (B), in which part thereof overlaps with the first portion (A), and another part thereof overlaps with the second portion (B). Alternatively, the display region may be partitioned into the first portion (A), second portion (B) and a bending region. When partitioned, respectively, the first portion (A), second portion (B) and bending region, which are regions with different types of displayed information, may be partitioned as having different types of user graphic interfaces (GUIs).

On the other hand, the bending region may not be preset but formed in various ways due to an external force bending the body of the mobile terminal. More specifically, the bending region may be formed by an external force at any position along the horizontal direction and/or vertical direction of the mobile terminal, and the body of the mobile terminal may be bent based on the bending region formed by the external force. In other words, the bending region may vary according to an externally applied force.

The display unit 151 may include a first portion (A) and a second portion (B) divided by the bending region 210. More specifically, the display unit 151 may include the first portion (A), and the second portion (B) rotatably formed based on the bending region 210 formed at one side of the first portion (A) to become either one of a state that covers the first portion (A) and a state that does not cover the first portion (A).

Either one of the position and size of the first portion (A) and second portion (B) may vary according to a position at which the bending region 210 is formed. Hereinafter, for the sake of convenience of explanation, a mobile terminal according to an embodiment of the present disclosure will be described in detail using an example in which the bending region 210 is formed at the center of the display unit 151 such that the first portion (A) and the second portion (B) are horizontally symmetrical.

On the other hand, the state of the mobile terminal body may be defined as various states according to an included angle formed by the first portion (A) and second portion (B).

Figure 2C:
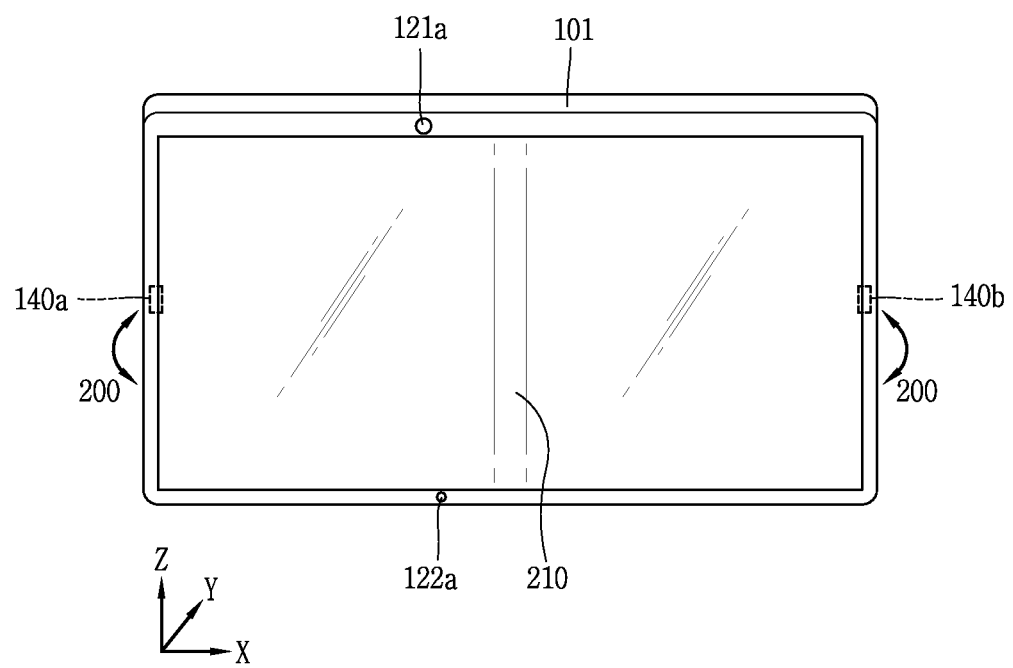

For example, as illustrated in FIG. 2C, a state in which the display unit 151 is not bent such that the first portion (A) and second portion (B) form a flat plane may be defined as a "plane state." The entire region of the display unit may be exposed to an outside to allow display, and driven as a large screen.

Figure 2D:
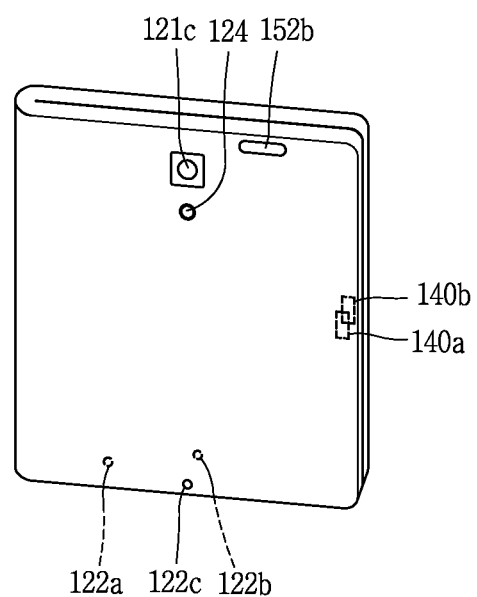

For another example, as illustrated in FIG. 2D, a state in which the first portion (A) and second portion (B) are folded with each other (or a state in which the left and the right end of the mobile terminal are bent to face each other may be defined as a "closed state." The closed state may be used to keep the mobile terminal in a pocket, a bag or the like. In a closed state, it may be possible to prevent the flexible display unit 151 from being scratched or damaged to facilitate portability due to its small size.

Here, a state in which the first portion (A) and second portion (B) are folded with each other denotes a state in which the screens of the display unit 151 are brought into contact with each other or close to each other within a reference distance.

Figure 2E:
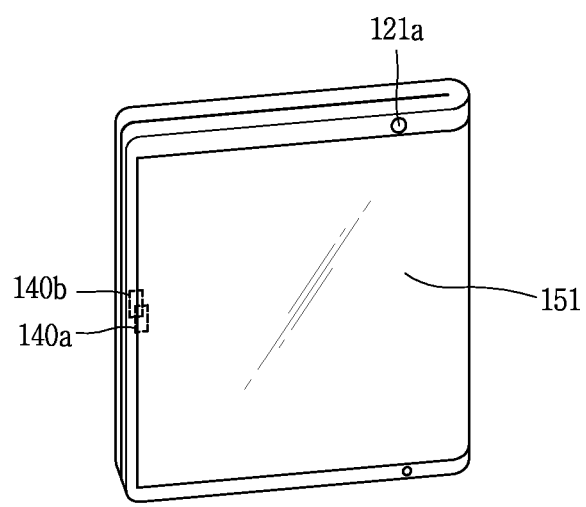

For still another example, as illustrated in FIG. 2E, a portion of the rear surface is brought into contact with (or folded with) the remaining portion may be defined as a "divided state." In a divided state, the first portion (A) of the display unit is disposed on a front surface thereof, and the second portion (B) thereof is disposed on a rear surface thereof. In a divided state, the controller 180 may perform control that seems to be divided though the display unit 151 is not physically divided. For example, the first portion (A), second portion (B) and bending region may be logically divided to display different screen information. In other words, as they have different types of user graphic interfaces (GUIs), the first portion (A) and second portion (B) may be partitioned.

In other words, the mobile terminal 100 may be implemented with a structure that can be folded or unfolded like a notebook. Accordingly, a user may apply a force to the display unit 151 to bend or fold it based on one or more bending regions, thereby selecting a portion of the display or the entire display on which screen information is displayed. Alternatively, the display unit 151 may be bent to be in a closed state, thereby protecting the display unit 151 from scratches or other damages.

In addition, the controller 180 may distinguish the state of the mobile terminal in various ways according to a position at which the bending region is formed, a degree of bending, a direction of bending, a speed of bending, and the like. For example, when bending has occurred based on the bending region 210, the controller 180 may distinguish a case where the display unit 151 is bent in a "y+" direction from a case where the display unit 151 is bent in a "y−" direction as a different state.

On the other hand, the controller 180 may execute a different function or display different screen information on the display unit 151 based on the state of the mobile terminal. Since a different function is carried out or a different interface is provided according to a bending degree of the display unit, it is very important to accurately measure the bending degree of the display unit.

Hereinafter, a method of sensing the state of the mobile terminal body (or information on the bending of the display unit) will be described in more detail with reference to FIGS. 3A through 5C.

First, a mobile terminal according to the present disclosure may sense a change of the state of the body or display unit. More specifically, the controller 180 may determine the state of the mobile terminal among the foregoing states using the first and the second sensing unit 140a, 140b. The first and the second sensing unit 140a, 140b may include at least one of an acceleration sensor and a geomagnetic sensor, respectively, to sense a relative movement of the left and the right end of the body. For example, the controller 180 may sense that the display unit 151 is switched from a plane state to a closed state or sense that the first portion (A) and second portion (B) of the display unit 151 are orthogonal to each other.

For another example, the sensing unit 140 may include a bend sensor (not shown) disposed on one of a front surface or rear surface of the flexible display unit 151 or disposed on both surfaces thereof to sense the bending of the flexible display unit 151. Here, the bend sensor may be bent by itself, and corresponds to a sensor for sensing the bending using the property in which a resistance value varies according to the bending degree. For example, a fiber optic bending sensor using a deformation rate of optical fiber, an electrical resistance type bending sensor using an electrical resistance, a strain gauge, and the like may form a bend sensor. The sensing unit 140 may calculate a resistance value of the bend sensor using a magnitude of voltage applied to the bend sensor or a magnitude of current flowing through the bend sensor, and sense a position at which bending has occurred, a degree of bending and the like, using a size of the calculated resistance value.

When the sensing unit 140 senses bending by the bend sensor, the controller 180 may search a bending region based on the resistance value calculated by the bend sensor to, and distinguish the first and the second portion (A, B) based on the bending region to determine the body state of the mobile terminal.

Figure 3A:
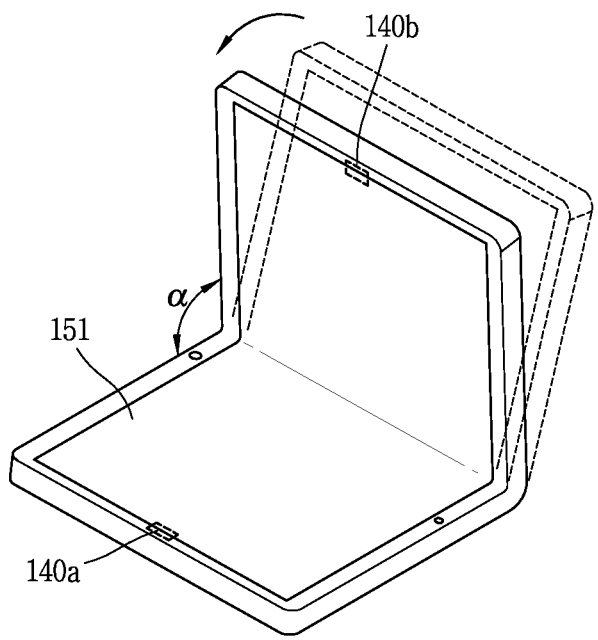
FIGS. 3A through 3C are views for explaining a method of sensing a state change of a display unit in a mobile terminal according to the present disclosure.
Figure 3B:
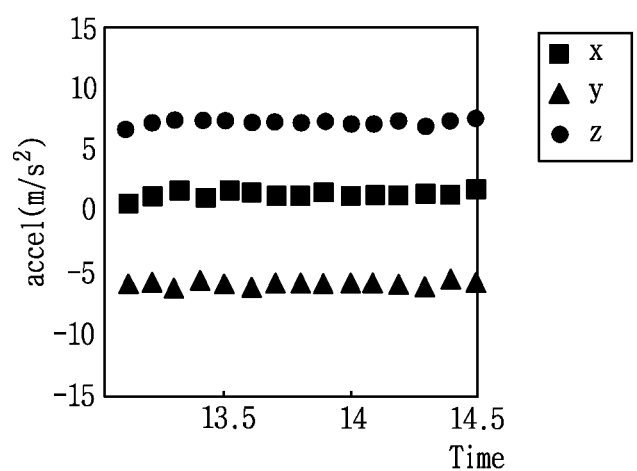
Figure 3C:
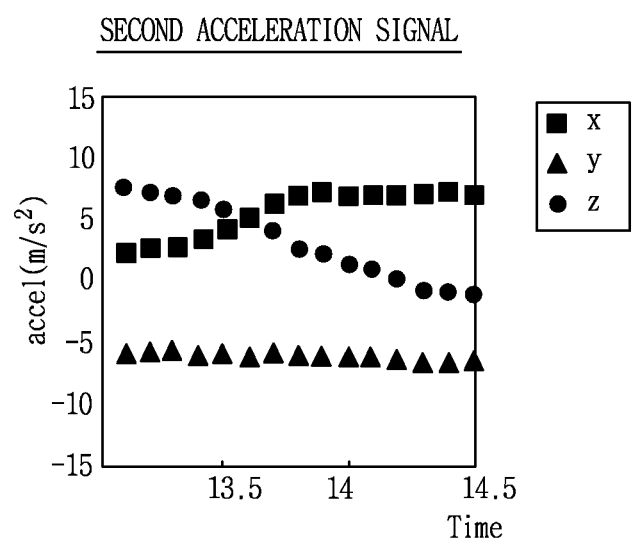

FIGS. 3A through 3C are views for explaining a method of sensing a state change of a display unit in a mobile terminal according to the present disclosure.

As illustrated in FIG. 3A, the first sensing unit 140a and the second sensing unit 140b are disposed at the left and right sides of the body of the mobile terminal 100, respectively, based on a bending region. The first sensing unit 140a is disposed at the left end of the body to generate a first signal corresponding to the movement of the left end, and the second sensing unit 140b is disposed at the right end of the body to generate a second signal corresponding to the movement of the right end.

FIG. 3A illustrates an embodiment in which the right end of the body rotates in a state that the left end of the body is fixed, and FIG. 3B illustrates a first signal generated by the first sensing unit 140a in the foregoing embodiment, and FIG. 3C illustrates a second signal generated by the second sensing unit 140b in the foregoing embodiment. The first and the second sensing unit 140a, 140b are configured with acceleration sensors, and signals generated by the acceleration sensors may include acceleration values for z-axis corresponding to a gravity direction and for x- and y-axes which are orthogonal to each other with respect to the z-axis.

The controller 180 may measure a bending speed and a bending degree of the body using the first and the second signal when there is movement such as folding or unfolding.

Here, the bending degree may be defined as the flexing information of the display unit 151 based on a bending region. The flexing information denotes an included angle ($\alpha$) formed by the first portion of the display unit 151 located at the left side and the second portion located at the right side based on a bending region.

The data variations of signals generated from the two sensing units 140a, 140b are differently measured according to the speed of folding or unfolding the body. The controller 180 may accurately calculate the bending speed and included angle using the data variation, and sense a state change of the body or display unit.

Figure 4A:
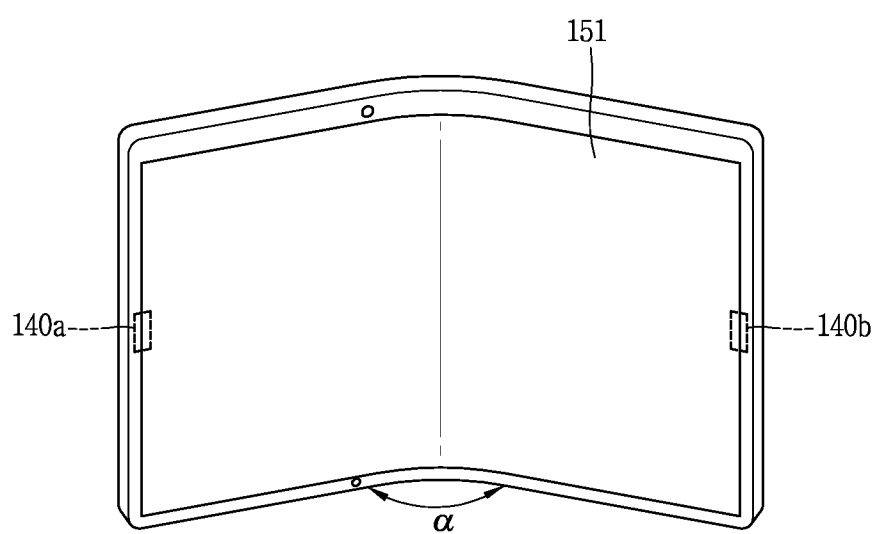
FIGS. 4A through 4C are views for explaining a method of sensing a bending degree of a display unit in a mobile terminal according to the present disclosure.
Figure 4B:
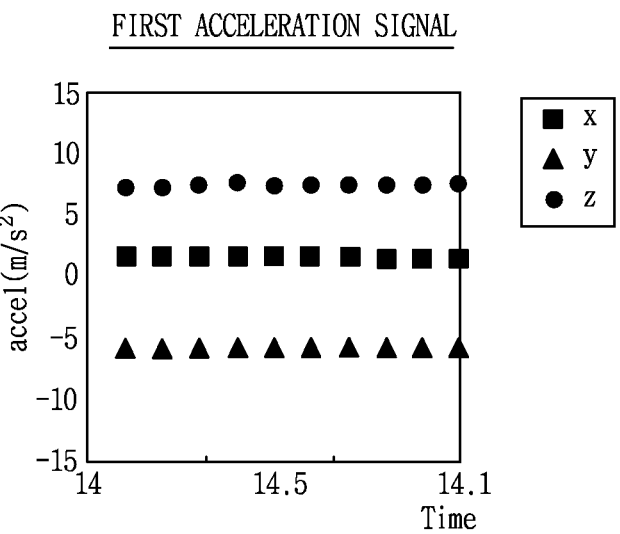
Figure 4C:
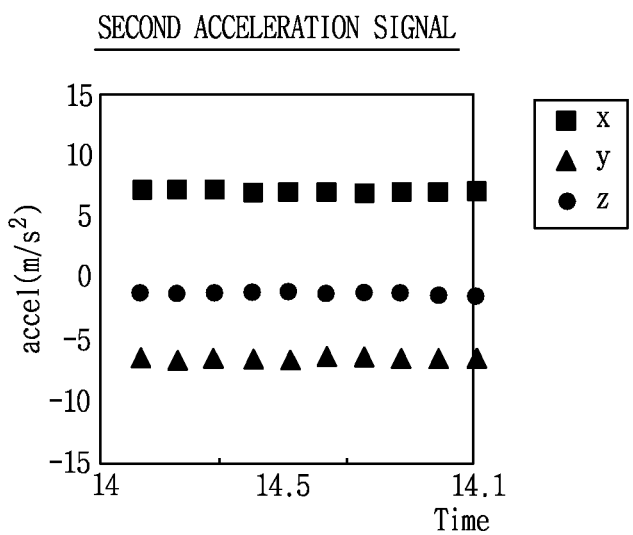

Furthermore, even when there is no movement of the body, the controller 180 may calculate the included angle ($\alpha$) using the first and the second signal. FIGS. 4A through 4C are views for explaining a method of sensing a bending degree of a display unit in a mobile terminal according to the present disclosure.

As illustrated in FIG. 4A, even when the mobile terminal is motionlessly placed, as illustrated in FIGS. 4B and 4C, a first and a second signal generated by the first and the second sensing unit 140a, 140b generate a difference according to a folding angle. The controller 180 may calculate the included angle (α) using a difference between acceleration values included in the first and the second signal.

The acceleration sensor is inexpensive and has low power consumption, and thus has an advantage in design. Moreover, the controller 180 may accurately measure a bending degree with respect to all deformed angles using acceleration signals generated from different positions.

Moreover, the sensing unit may further include a geomagnetic sensor as well as an acceleration sensor. In other words, the first sensing unit 140a may include a first acceleration sensor and a first geomagnetic sensor, and a first signal generated from the first sensing unit 140a may include a first acceleration signal and a first geomagnetic signal. Similarly, the second sensing unit 140b may include a second acceleration sensor and a second geomagnetic sensor.

The controller 180 may collectively consider geomagnetic signals as well as acceleration signals to sense the state of the mobile terminal body (or deformation of the display unit).

Figure 5A:
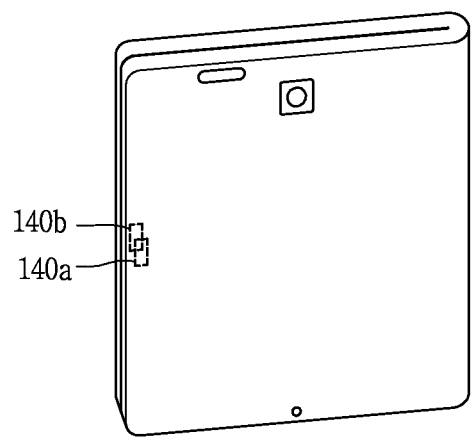
FIGS. 5A through 5C are views for explaining a method of sensing a closed/open state of a display unit in a mobile terminal according to the present disclosure.
Figure 5B:
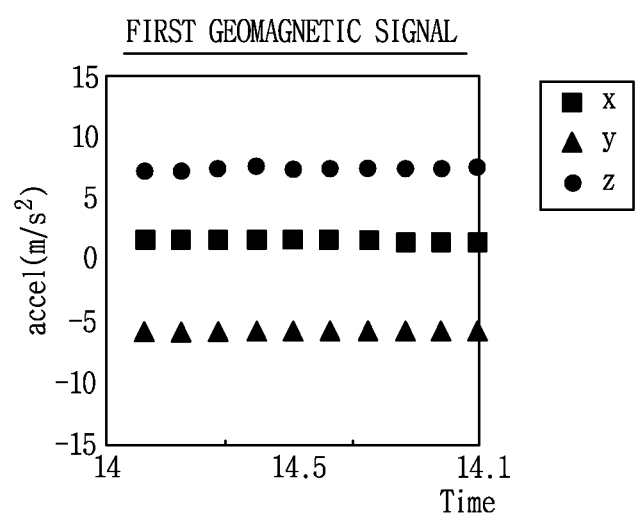
Figure 5C:
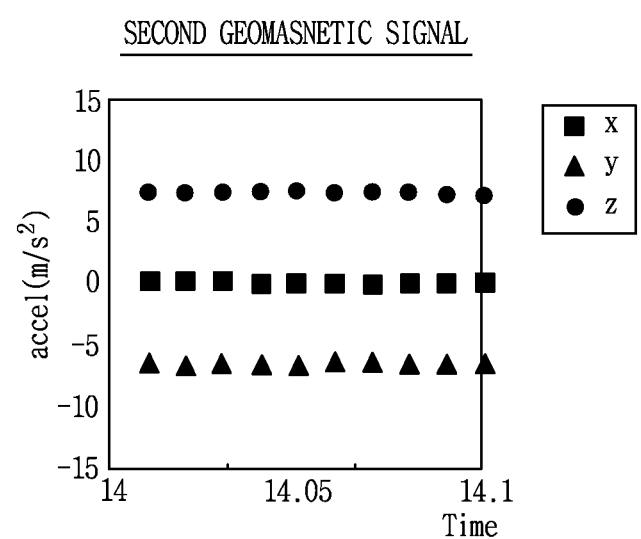

FIGS. 5A through 5C are views for explaining a method of sensing a closed/open state of a display unit in a mobile terminal according to the present disclosure.

As illustrated in FIG. 5A, when the first portion (A) and second portion (B) overlap with each other, as illustrated in FIGS. 5B and 5C, a first geomagnetic signal and a second geomagnetic signal may have a substantially same value within a reference range. Using such a property, the controller 180 may more accurately sense whether or not the mobile terminal is in a closed state. In other words, the controller 180 may determine whether or not the mobile terminal is in a closed state using a signal generated from the geomagnetic sensor and a signal generated from the acceleration sensor, and generate information associated with the deformation of the display unit 151 using a signal generated from the acceleration sensor when the mobile terminal is not in a closed state.

On the other hand, the geomagnetic sensor may sensitively respond to a magnetic body located at a position adjacent to the body, thereby providing inaccurate information to a user due to the magnetic body. However, a mobile terminal according to the present disclosure may measure an ambient magnetic field using a plurality of geomagnetic sensors disposed at different positions (for example, the left and right ends of the body), and compensate a geomagnetic signal based on the measured ambient magnetic field. For example, the controller 180 may compare an absolute signal of the first geomagnetic signal and an absolute signal of the second geomagnetic signal with a reference value, and determine whether or not to use at least one of the first and the second geomagnetic signal according to a result of the comparison. When the absolute value is larger than the reference value, it may correspond to a case where a size of the output value increases by the magnetic body, and thus the corresponding signal may not be used. As a result, it may be possible to prevent incorrect geomagnetic information from being provided.

Figure 6A:
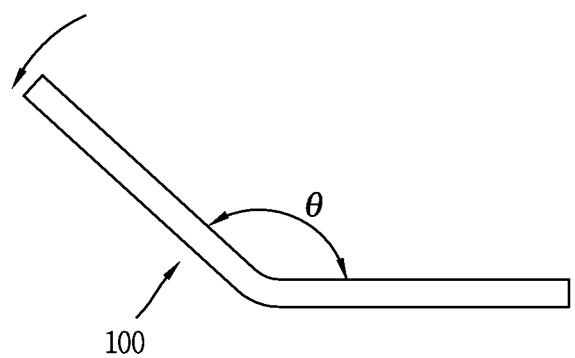
FIGS. 6A and 6B are views for explaining an included angle formed by bending in a mobile terminal according to an embodiment of the present disclosure.
Figure 6B:
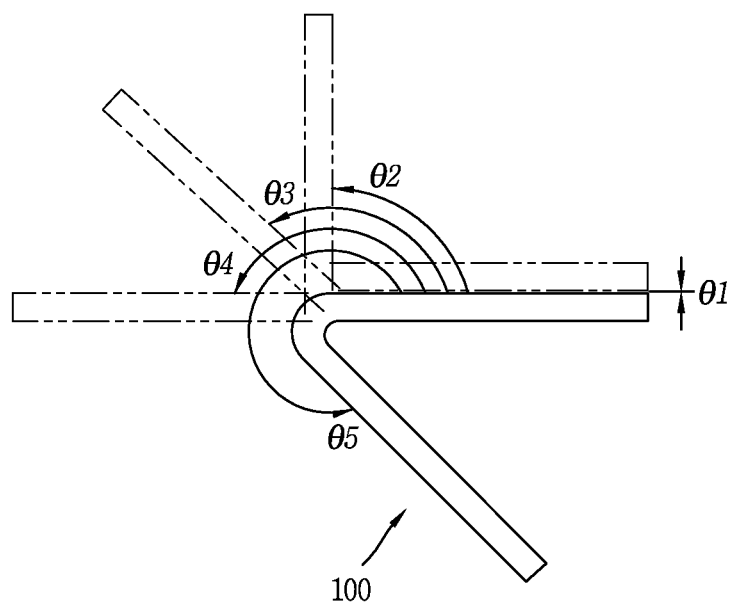

FIGS. 6A and 6B are views for explaining an included angle formed by bending in a mobile terminal according to an embodiment of the present disclosure.

As described above, an "included angle" according to the present disclosure denotes an angle formed by the first portion (A) located at the left side of the display unit 151 and the second portion (B) located at the right side thereof. In a closed state in which the first portion (A) and second portion (B) overlap with each other, the included angle is defined as zero degree or a state close to zero degree within a predetermined range, and in a divided state in which part of the rear surface of the body overlap with the remaining portion, the included angle is defined 360 degrees or a state close to 360 degrees within a predetermined range. A mobile terminal according to the present disclosure may be freely deformed between zero and 360 degrees.

On the other hand, according to the present disclosure, a "forward-tilting event" denotes that inner displays, namely, a first portion (A) and a second portion (B), are tilted forward by a predetermined angle around a bending region as an external force is applied to a body surrounding the first portion (A) and the second portion (B) on a terminal. In other words, when a size of the included angle decreases compared to the previous state, it may be referred to as "forward-tilting event has occurred." In this manner, when the forward-tilting event occurs and the included angle decreases to an angle between zero and 180 degrees, it may be said that the first portion (A) and the second portion (B) becomes a "forward-tilting state."

On the contrary, a "backward-tilting event" denotes that inner displays, namely, a first portion (A) and a second portion (B), are tilted backward by a predetermined angle around a bending region as an external force is applied to a body surrounding the first portion (A) and the second portion (B) on a terminal. In other words, when a size of the included angle increases compared to the previous state, it may be referred to as "backward-tilting event has occurred." In this manner, when the backward-tilting event occurs and the included angle decreases to an angle between 180 and 360 degrees, it may be said that the first portion (A) and the second portion (B) becomes a "backward-tilting state." When the external force is removed, the backward tilting state may be elastically restored again to a plane state, namely, to a state in which the first portion (A) and second portion (B) are in a flat state.

FIG. 5A is a view for explaining a forward-tilting state of the mobile terminal 100 with a hinge structure corresponding to a bending region, for example, due to a click hinge," and FIG. 5B is a view for explaining a backward-tilting state of the mobile terminal 200 with a hinge structure corresponding to a bending region, for example, due to a free-stop hinge."

The click hinge is to implement a structure of automatically opening or closing as passing a specific angle (θ), and the free-stop hinge is to implement a structure capable of allowing a user to open at his or her desired angle. For example, as illustrated in FIG. 5B, the user may open or close at various angles (θ1, θ2, θ3, θ4).

According to the present disclosure, the "included angle" denotes an angle formed by the first portion (A) located at the left side of the display unit 151 and the second portion (B) located at the right side.

Figure 7:
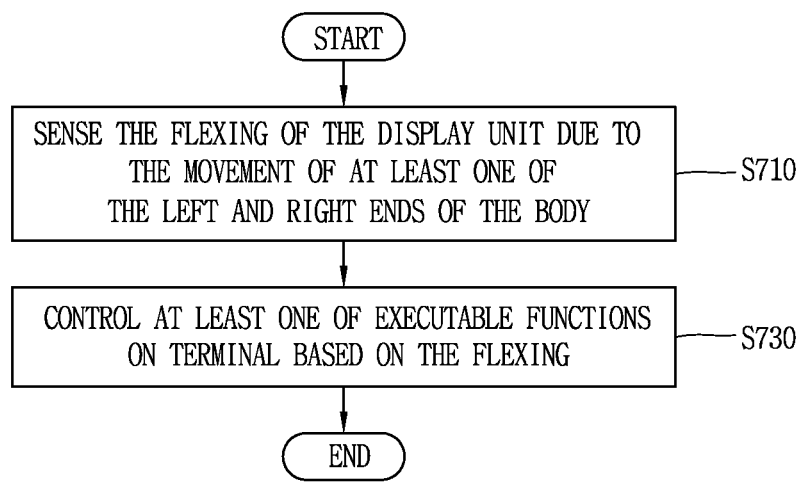
FIG. 7 is a representative flow chart for explaining an operation method of a mobile terminal according to an embodiment of the present disclosure.

FIG. 7 is a representative flow chart for explaining an operation method of a mobile terminal according to an embodiment of the present disclosure.

First, the controller 180 (refer to FIG. 1) senses the flexing of the display unit 151 (refer to FIG. 1) due to the movement of at least one of the left end and the right end of the body using the first and the second sensing unit 140a, 140b (refer to FIG. 2A) (S710).

When at least one region of the display unit is flexed as a physical force is applied to the display unit or body, the sensing unit 140 senses the flexing of the display unit. In a state that an external force is previously applied and flexing is maintained, it may be possible to sense a flexing degree.

Here, flexing is carried out by an external physical force applied to the display unit 151 or body, and the external physical force may be applied by a user or object.

Next, the process of controlling at least one of executable functions on a terminal based on flexing is carried out (S730). In other words, when the display is flexed based on a bending region, the controller 180 divides the display unit into the first portion (A) and the second portion (B). Furthermore, the controller 180 may execute a different control function based on the flexing.

Here, executable functions on a terminal may denote all types of functions that can be executed or driven on a mobile terminal. For example, one of the executable functions may be an application installed in the mobile terminal. For example, "an arbitrary function being executed" may denote "an arbitrary application being executed or driven."

For another example, an executable function on a mobile terminal may be a function of generating or receiving an event. Here, the generated event may be an alarm generation event, a backward event, a photo capture event, and the like, and the received event may be a message receiving event, a call receiving event, and the like. Meanwhile, the event may be an event occurred on an application installed in a mobile terminal.

For still another example, an executable function on a mobile terminal may be a function required for the basic operation of the mobile terminal. For example, the function required for the basic operation may include a function of turning on/off an illumination provided in the display unit 151, a function of switching the mobile terminal from a released state to a locked state or on the contrary, switching the mobile terminal from a locked state to a released state, a function of setting a communication network, a function of changing the setting information of the mobile terminal, and the like.

As described above, according to the present disclosure, the controller 180 may control at least one of executable functions on a mobile terminal according to the flexing characteristic of the display unit.

A mobile terminal according to the present disclosure may recognize the flexing due to at least one of the left and right ends of the body as an input of a control command. The movement may include bending-and-back and bending-and-hold. Here, bending may include the folding of a rigid panel as well as the flexing or bending of a flexible panel.

A bending-and-back command denotes a user interface mode in which an included angle of the flexible display unit is flexed or bent within an effective angle range and then unfolded again within an effective period of time to thereby execute a predetermined function in a mobile terminal.

More specifically, in a state that an included angle of the display unit is 180 degrees or close to 180 degrees within a predetermined range, a mobile terminal senses flexing such that the included angle becomes a predetermined angle within an effective angle range, for an example, a range between 150 and 160 degrees. Then, the mobile terminal senses that the display unit is restored to an original state within an effective period of time (for example, 1 second). The original state refers to a state in which an included angle of the display unit is 180 degrees or close to 180 degrees within a predetermined range.

The mobile terminal executes a control function corresponding to the bending-and-back command in response to an input of the bending-and-back command.

Here, the effective angle range denotes a range of a preset included angle by the manufacturer to recognize a bending-and-back command, and as illustrated in the present embodiment, the present disclosure may not be necessarily limited to having an angle range between 150 and 160 degrees, and may be also set to various ranges. Furthermore, the effective angle range may be changed to an angle range specified by a user according to circumstances. In other words, a portable device may allow a user to directly change an effective angle range through an environment setting menu, thereby allowing the user to optimize the portable device based on his or her own use pattern.

The effective angle range may include a plurality of ranges, and a different control function may be associated with each range. For example, a first effective angle range may be set to an angle between 150 and 160 degrees, and a first control function may be set to the first effective angle range. Furthermore, a second angle range may be set to an angle between 120 and 130 degrees, and a second function may be set to the second effective angle range. When a bending-and-back command is carried out within the first effective angle range, the first control function is executed, and when it is carried out within the second effective angle range, the second control function is executed.

Furthermore, an effective period of time is a period of time previously set by the manufacturer to recognize a bending-and-back command, and counted from a time point at which the included angle enters an effective angle range. According to the present embodiment, it is illustrated that an effective period of time taken from a time point at which the included angle enters an effective angle range to a time point at which the display unit is unfolded again is 1 second, but the effective period of time may beset to be greater or less than 1 second. Similarly, the mobile terminal may be configured to set a user's desired time to an effective period of time so as to optimize a portable device according to the user's use pattern.

In the foregoing embodiment, a bending-and-back command has been described using parameters such as an effective angle range, an effective period of time, and the like, but the present disclosure may not be necessarily limited to this, and according to another embodiment, the mobile terminal may enter a bending-and-back command without using an effective angle range. In other words, when at least one of the left and right ends of the display unit is moved in a first direction to vary an included angle, and then moved in a second direction substantially opposite to the first direction within a predetermined period of time to allow the included angle to be restored to an original angle (or an angle close to the original angle within a predetermined range), the mobile terminal may recognize that the bending-and-back command has been entered.

The foregoing bending-and-back command may be subdivided according to whether or not there is an additional input. For example, when at least one of the left and right ends of the display unit is moved in a first direction to allow the included angle to enter an effective angle range, and then a user's touch input is applied to the display unit within an effective period of time or an additional input that presses at least one physical button, and the at least one is moved in a second direction opposite to the first direction to allow the included angle to get out of the effective angle range, the mobile terminal may recognize it as an input of a bending-and-back command for performing a different function from that of the foregoing bending-and-back command. In other words, a bending-and-back command in which part of the display unit is folded and unfolded is divided into a bending-and-back single command in which there is no additional input by the user within an effective period of time and a bending-and-back combination command in which there is an additional input (a touch of the screen or a pressing of the physical button) by the user within an effective period of time. The mobile terminal may be configured to execute a different function for the bending-and-back single command and bending-and-back combination command, thereby the execution of a subdivided bending-and-back command.

On the other hand, a bending-and-hold command denotes a user interface mode in which an included angle of the flexible display unit is folded within an effective angle range and maintained for an effective period of time to thereby execute a preset function on the mobile terminal.

More specifically, a mobile terminal senses that the display unit is flexed and the included angel due to the flexing enters the effective angle range as at least one of the left and right ends of the display unit is moved to an inner side or outer side of the display unit. When the included angle maintains the effective angle range for the effective period of time (for example, 1 second), the mobile terminal determines that a bending-and-hold command has been entered to execute a control function corresponding to the bending-and-hold command.

Here, the effective angle range, effective period of time and the like may be preset by the manufacturer or specified by the user similarly to the foregoing description.

The bending-and-hold command may be subdivided according to whether or not there is an additional input similarly to the bending-and-back command. For example, when the display unit is flexed to allow the included angle to be within an effective angle range ($\Delta\alpha$), and then a user's touch input to the display unit is sensed or an additional input for pressing at least one physical button is sensed while flexing is maintained for an effective period of time, the mobile terminal may recognize it as an input of a bending-and-hold command for performing a function different from that of the foregoing bending-and-back command. In other words, a bending-and-hold command in which an included angle subsequent to folding is maintained for an effective period of time within an effective angle range is divided into a bending-and-hold single command in which there is no additional input by the user within an effective period of time and a bending-and-hold combination command in which there is an additional input by the user within an effective period of time. The mobile terminal may be configured to execute a different function for the bending-and-hold single command and bending-and-hold combination command, thereby the execution of a subdivided bending-and-hold command.

On the other hand, the bending-and-hold command may be configured to perform a function in which consecutive operations are carried out on a predetermined an application. More specifically, the mobile terminal executes a control function corresponding to the bending-and-hold command in response to an input of the bending-and-hold command. When the included angle is maintained within an effective angle range, the mobile terminal may consecutively execute functions such as zoom-in/out, fast playback, rewind, volume up/down, page break, and the like. Then, when the included angle gets out of the effective angle range, the mobile terminal stops a control function due to the bending-and-hold command.

On the other hand, when a control function is carried out based on a bending-and-back command or bending-and-hold command, the mobile terminal may execute a different control function or execute the same control function but set a different setting value associated with the control function according to the flexing characteristic. For example, when a bending-and-back command is entered, the mobile terminal may execute a different type of control function according to the flexing characteristic of the entered bending-and-back command. For another example, the mobile terminal may execute a control function corresponding to a bending-and-back command in response to an input of the bending-and-back command, but set a different setting value associated with the control function according to the flexing characteristic.

Here, the flexing characteristic may be measured by a first sensing unit disposed at a left side of the body to generate a first signal based on the movement of the left end and second sensing unit disposed at a right side of the body to generate a second signal based on the movement of the right end. As described above, a mobile terminal according to the present disclosure senses the flexing of the display unit due to the movement of at least one of the left and right ends.

For example, when the right end is moved in an inward direction of the display unit in a state that the left end is fixed, the first signal generated from the left end is not changed but the second signal generated from the right end is changed. The mobile terminal may measure a variation of the included angle according to the movement of the right end, a moving direction of the right end, a moving speed, and a maximum included angle and a minimum included angle due to the right end using the first and the second signal. For another example, when the left and right ends are moved in an inward direction of the display unit at the same time, the mobile terminal may measure the flexing characteristic according to the movement of the left and right ends using the first and the second signal.

The flexing characteristic may be associated with at least one of a moved portion (a left end and/or a right end of the body) to flex the display unit between both ends of the body, a moving direction of the moved portion, a moving speed, a variation of the included angle, a maximum included angle, and a minimum included angle.

A different type of control function may be carried out according to the flexing characteristic or a setting value associated with the control function may be differently set according to the flexing characteristic even though the same control function is carried out.

For example, a first control function may be carried out when a bending-and-back command due to the movement of the right end is entered in a state that the left end is fixed, and a second control function different from the first control function may be carried out when a bending-and-back command due to the movement of the left end is entered in a state that the right end is fixed.

For another example, when a bending-and-back command due to the movement of the right end is entered in a state that the left end is fixed, a first control function may be carried out. At this time, a setting value associated with the first control function may be differently set according to at least one of a moving speed of the right end, a moving direction, and a variation of the included angle according to the movement of the included angle.

A setting value associated with the control function may vary according to the control function, and for example, may be at least one of a brightness of the display unit, an audio output intensity of the audio output module, a scale of map, a zoom of camera, and an intensity of vibration. In other words, the executed control function is a brightness adjustment function, an adjusted brightness value may differently set according to the flexing characteristic. For another example, when the control function is a page break function, a number of turned pages (or amount of pages) may vary according to the flexing characteristic. The control function and a setting value associated with the control function may be modified in various ways according to the embodiments.

On the other hand, the controller 180 controls the display unit 151 to display an execution screen according to the execution of a function in a state that the body is open. Here, the open state denotes a state that part of a display region disposed on an inner surface of the terminal is partially or entirely unfolded and exposed on a front surface. Furthermore, the open state may include a case in which the display disposed on an inner surface is unfolded flat as well as a state in which the display is bent or tilted back at a predetermined angle based on the bending region.

The execution screen denotes information displayed on the display unit 151 to allow a user to visually recognize it. For example, the execution screen may be an execution screen of a specific application (for example, web browser, video playback, schedule management, call, game, music, documentation, message, banking, e-book, traffic information, an application associated with a program for performing a function of application update, etc.) or a home screen page, a lock screen, or screen information that has previously displayed prior to switching the terminal to a closed state.

Various execution screens may be displayed as various functions are carried out, but hereinafter, embodiments of executing a function associated with an electronic document will be described.

FIGS. 8A through 8E are exemplary views for explaining an operation associated with an electronic document according to an embodiment of the present disclosure.

An electronic document may be also referred to as a digital book, and configured with an electronic file that can be taken out and read anytime, anywhere on a portable mobile terminal. Contrary to a paper book, the electronic document may allow fast search, and information to be immediately modified or converted to recent one, and may include multimedia information such as sound or video as well as text. Furthermore, the electronic document may include Word files, PDF files, Text files, and the like, and digital rights management (DRM) may be added thereto to prevent piracy and unauthorized distribution.

Hereinafter, an application or program for reproducing an electronic document may be referred to as an "electronic document reader." The electronic document reader may reproduce all types of information (for example, text, sound, images, hyperlink information, video, memo, highlight, bookmark, etc.). For the purpose of this, the electronic document reader may set a playback mode (for example, a text mode, a sound mode, an image mode, a mixed dual mode, etc.) according to the format of the played back information.

The electronic document reader may read and display an electronic document selected by a user from the memory 170, and receive and display the electronic document from an external server. Here, "the process of calling a menu of the electronic document reader," "the process of selecting a electronic document load menu," "the process of selecting a folder in which the electronic document is stored," "the process of selecting an electronic document from an electronic document list," and the like may be sequentially carried out.

An electronic document may include various screen information that can be displayed on the display unit 151. For example, an electronic document may include a web page, a digital image, a word processing, a spreadsheet, an email, a presentation document, a list of items, information items and an application execution screen, and the like.

An electronic document may include a plurality of pages, one of the plurality of pages may be displayed on the display unit 151. The display order of the plurality of pages has been preset, and sequentially displayed according to a user input.

The controller 180 may control the display unit 151 to display at least one of a plurality of pages included in an electronic document. A number of pages displayed on one screen may be modified according to embodiments, but for the sake of convenience of explanation, the operation of a mobile terminal according to the present disclosure in which two pages are displayed on the entire region of the display unit 151 will be described, for example. Meanwhile, a number of pages displayed on one page may be changed by a user input such as pinch-in or pinch-out.

Figure 8A:
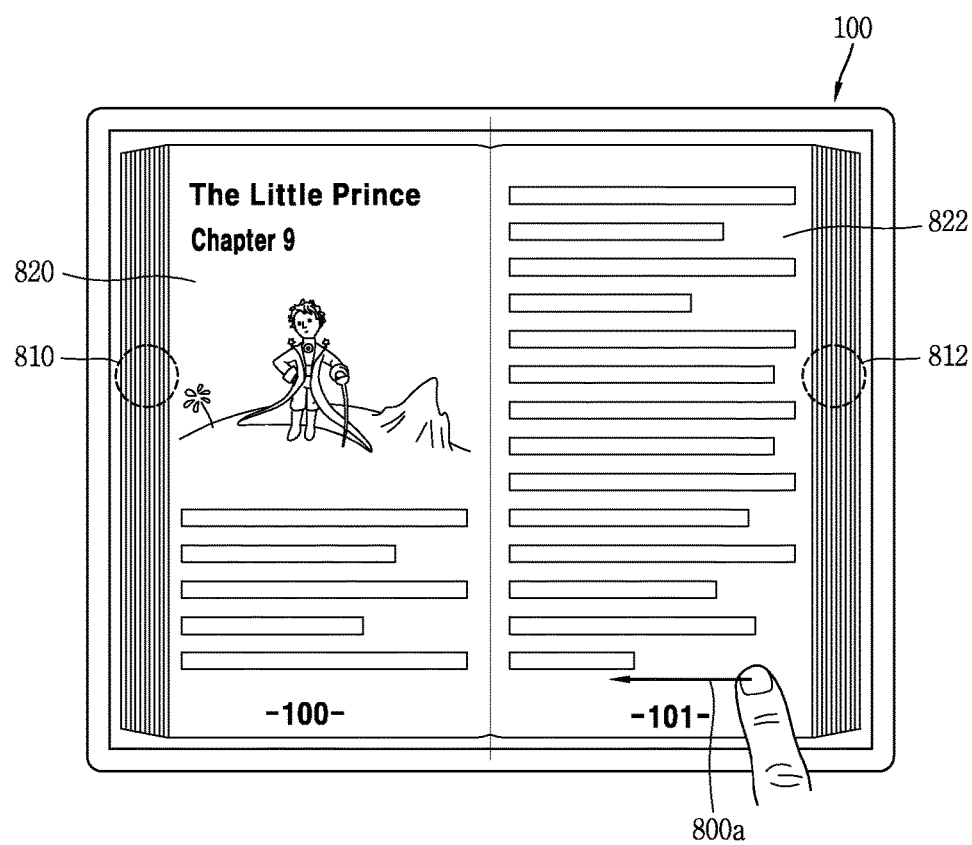
FIGS. 8A through 8E are exemplary views for explaining an operation associated with an electronic document according to an embodiment of the present disclosure.

Referring to FIG. 8A, an included angle of the display unit 151 is substantially 180 degrees (hereinafter, referred to as a first relative angle), a first page 820 of an electronic document and border lines 810 of previous pages are displayed in a first region, and a second page 822 of the electronic document and border lines 812 of subsequent pages may be displayed in a second region of the display unit 151. The first and the second page 820, 822 may include texts and/or illustrations of the electronic document.

The border lines 810, 812 denote a portion at which end portions of each page are displayed in a sequentially overlapping manner. The border lines 810, 812 may have different areas and distances according to a number of previous pages or subsequent pages, respectively. For an example, when currently displayed pages are located at the points of 20-40% on e-book content, the border lines 810 of previous pages and the border lines 812 of subsequent pages may be displayed with 0.5 cm and 1 cm, respectively.

For another embodiment, which is different from the illustration of the drawing, the border lines 802, 804 corresponding to previous and subsequent pages may be hidden. In this case, the border lines 810, 812 may be displayed when at least one of the left and right ends of the display unit 151 is slightly folded in an inward direction of the display unit 151 and then maintained for a predetermined effective period of time. It is because there exists a user's desire for checking the remaining pages.

When a preset touch input is applied in a state that the first and the second page 820, 822 are displayed, the controller 180 may change a page of the electronic document displayed on the display unit 151. For example, when a touch applied to one point of the display unit 151 is consecutively moved in a left direction and then released (800a), the controller 180 may display a third and a fourth page that follow the first and the second page 820, 822. When the first and the second page are a 100th and a 101st page, the third and the fourth page may be a 102nd and a 103rd page.

Here, the controller 180 may display the third and the fourth page while exhibiting a stereographic effect of turning a sheet of the second page 822. At the same time, a sound effect of turning a sheet of book paper may be outputted through the audio output unit.

Such a page move function may be carried out by the flexing of the body. Specifically, a user may take a gesture of turning a sheet of book paper using his or her hand that holds the body without applying a touch input to turn the sheet of book paper.

Figure 8B:
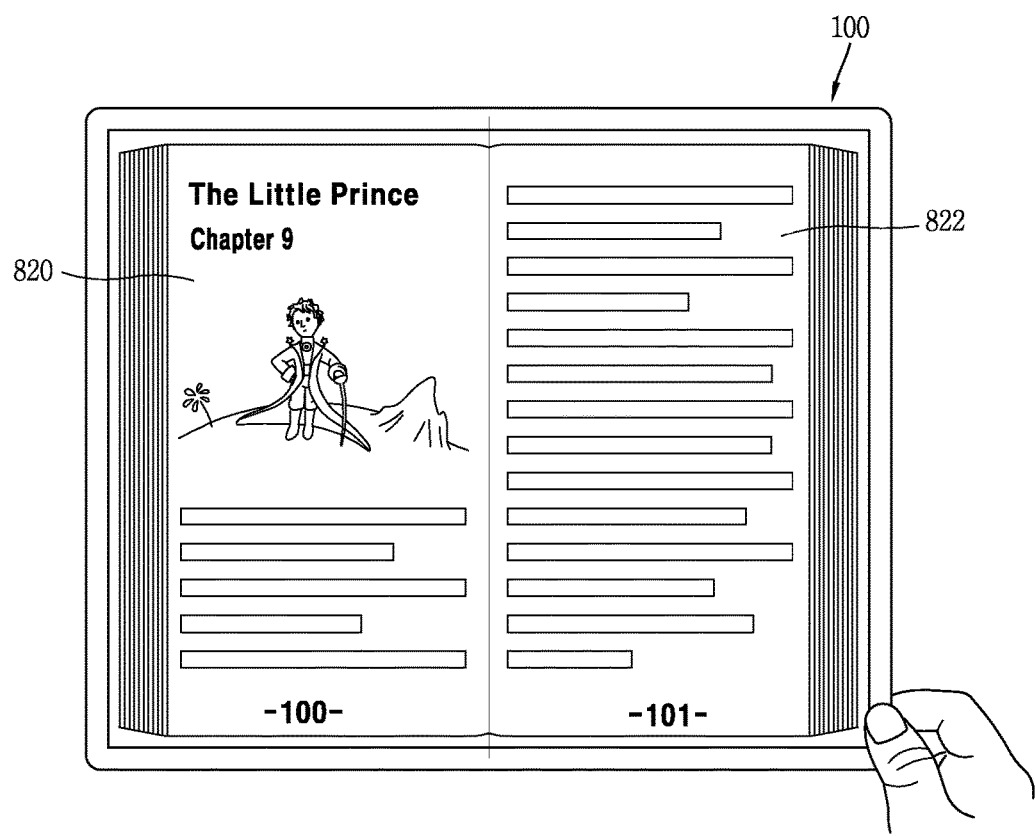
Figure 8B:
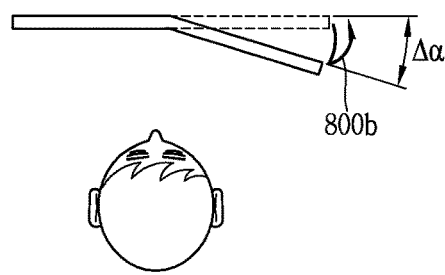

As illustrated in FIG. 8B, the controller 180 senses the flexing that occurs on the display unit 151 by relatively moving the right end of the body with respect to the left end of the body. In other words, the controller 180 senses that the included angle is decreased to be less than 180 degrees by rotating the right end of the body in an inward direction of the display unit 151 around the bending region of the display unit 151 formed by an external force. When it is sensed that the included angle reaches to an effective angle range, and the right end is restored to an original state again within an effective period of time, it is determined that a bending-and-back command 800b is entered.

Similarly, the controller 180 may sense an input of a bending-and-back command to the left end by relatively moving the left end with respect to the right end.

When a bending-and-back command is entered to the right end while displaying the first and the second page 820, 822, the controller 180 may display at least one subsequent page. In other words, the controller 180 may display a third and a fourth page in replacement of the first and the second page 820, 822.

On the contrary, when a bending-and-back command is entered to the left end while displaying the first and the second page 820, 822, the controller 180 may display at least one previous page. For example, when a bending-and-back command is entered to the left end while displaying a 100th and a 101st page, a 98th and a 99th page are instead displayed.

On the other hand, when a bending-and-back command is entered, the controller 180 may set a different number of moved pages according to the flexing characteristic. Specifically, a number of moved pages may vary according to an included angle variation (Δα) generated by the bending-and-back command. For example, a relatively large number of pages may be moved as the included angle variation increases, and a relatively small number of pages may be moved as the included angle variation decreases.

An included angle variation denotes a difference between a minimum included angle and a maximum included angle measured by movement based on prior to flexing the display unit by an external force. For example, if the included angle of the right end varies from 180 degrees to at least 150 degrees, then the included angle variation becomes 50 degrees.

When a bending-and-back command is entered to the right end while displaying an n-th page, an (n+t)th is displayed instead of the n-th page. The "n" and the "t" are natural numbers, and the "t" increases as the included angle increases. On the contrary, when a bending-and-back command is entered to the left end while displaying an n-th page, an (n−1)st is displayed instead of the n-th page.

Furthermore, an animation effect of turning pages may be differently applied according to a moving speed of the right end or the left end. For example, the animation effect of turning pages may be quickly carried out as the right end moves at a high speed, and the animation effect of turning pages may be slowly carried out as the right end moves at a low speed.

As a result, a user may have a feeling that seems to view an actual book while viewing an electronic document using a mobile terminal.

Figure 8C:
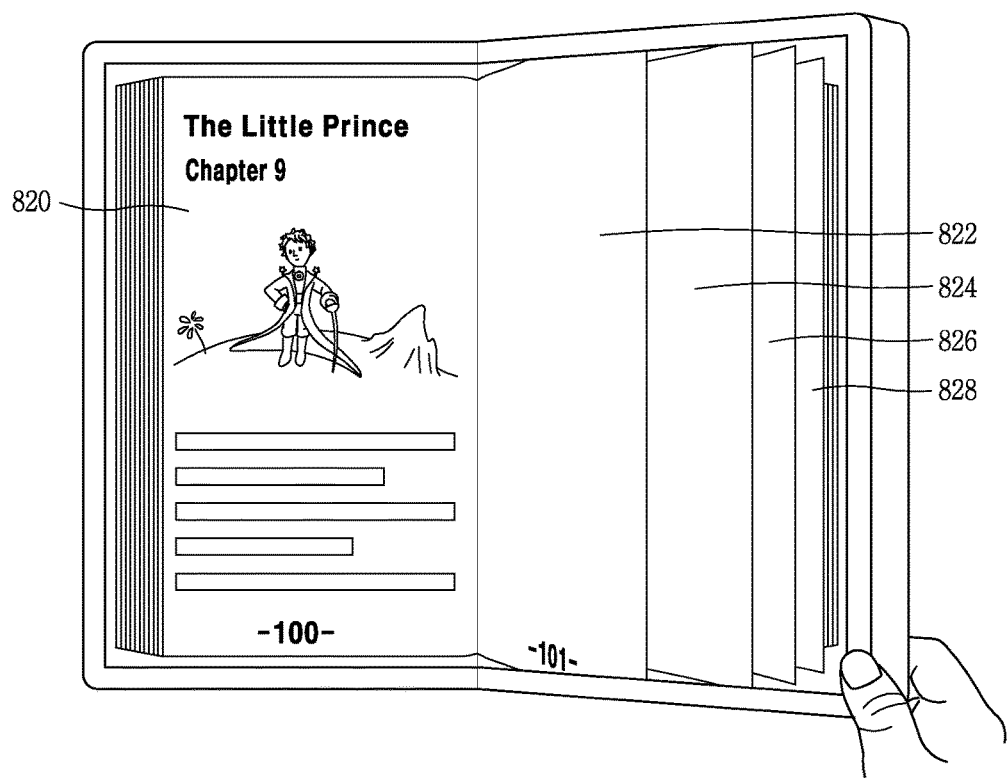
Figure 8C:
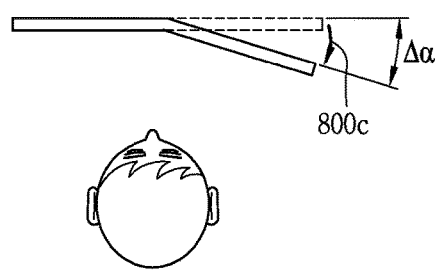

A predetermined sheet of book paper is turned once by a folding-and-back command 800b. On the contrary, as illustrated in FIG. 8C, when a folding-and-hold command 800c is applied, the controller 180 displays a graphic effect of consecutively turning pages to previous pages or subsequent pages 824-828 from pages 820, 822 being displayed, namely, moving images. Similarly to the folding-and-back command, a larger number of pages are turned as the included angle variation due to the folding-and-hold command increases.

When a folding-and-hold command is entered and the display unit is not restored to an original state in a state that the display unit is flexed, the controller 180 consecutively moves pages until the first or the last page is displayed.

On the other hand, while displaying a graphic effect of consecutively turning pages according to the folding-and-hold command 800c, the controller 180 may sense that the display unit 151 is restored to a state prior to entering the folding-and-hold command. In this case, the controller 180 stops page movement, and displays new pages that have not been turned on the display unit 151. The foregoing consecutive page move function (or page turn function) can be carried out at a different speed according to the included angle while the folding-and-hold command 800c is maintained. For an example, the included angle range may be subdivided into four angle ranges, and a single speed page move function in a backward direction may be carried out when the sensed included angle is within a first angle range, and a double speed page move function in a backward direction may be carried out when the sensed included angle is within a second angle range, and a single speed page move function in a forward direction may be carried out when the sensed included angle is within a third angle range, and a double speed page move function in a forward direction may be carried out when the sensed included angle is within a fourth angle range.

On the other hand, when a touch input is applied while a page move function is carried out by the folding-and-hold command, the controller 180 may stop the page move function. In other words, even though the flexing of the display unit 151 is maintained, the controller 180 may stop a page move function in response to a touch input applied to the display unit 151. It is because such a gesture is similar to a gesture of holding a sheet of book paper on a desired page while turning sheets of book paper.

On the other hand, there is a user's desire of bending the body for use. In other words, there may be a user's desire of using an electronic document in a state that the body is bent. In this case, the controller 180 should recognize it as a folding-and-hold command to restrict a page move function from being carried out.

Figure 8D:
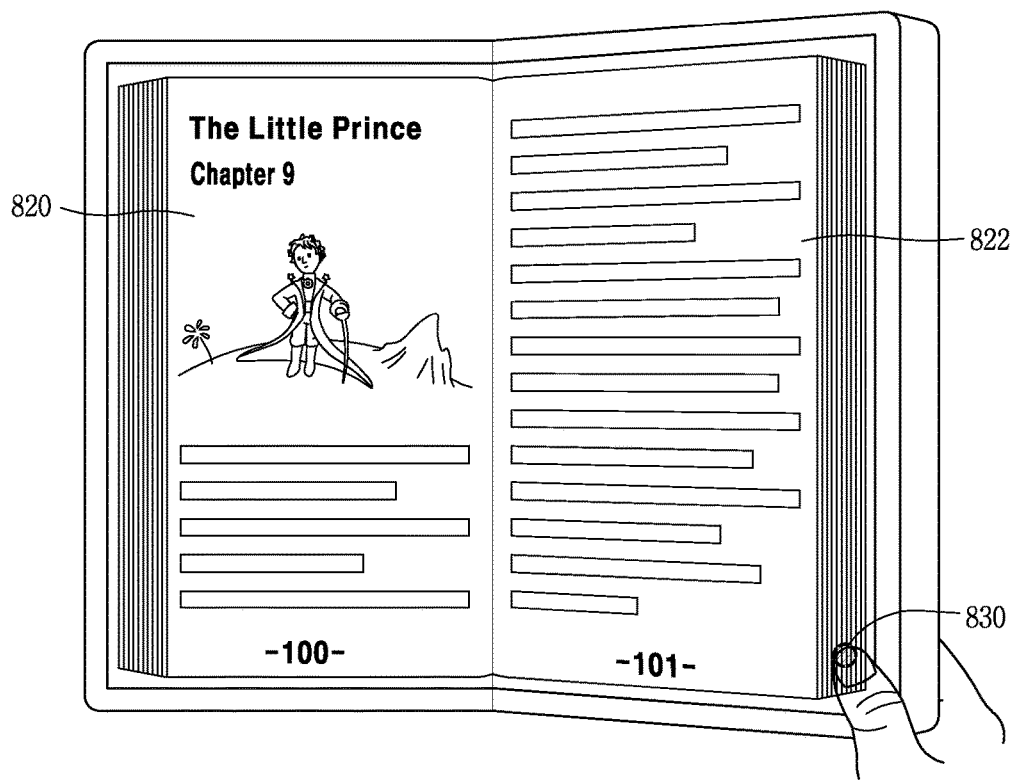
Figure 8D:
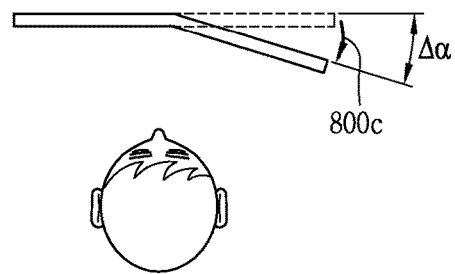

In order to solve this, as illustrated in FIG. 8D, when the flexing of the display unit 151 is sensed in a state that a touch 830 is applied to a predetermined region of the display unit 151, the controller 180 restricts a page move function from being carried out. Even though a touch is released in a state that the display unit 151 is flexed, the controller 180 continuously restricts a page move function from being carried out. In other words, when at least part of the display unit 151 is flexed in a state that a touch is applied thereto, the controller 180 does not execute a page move function.

Figure 8E:
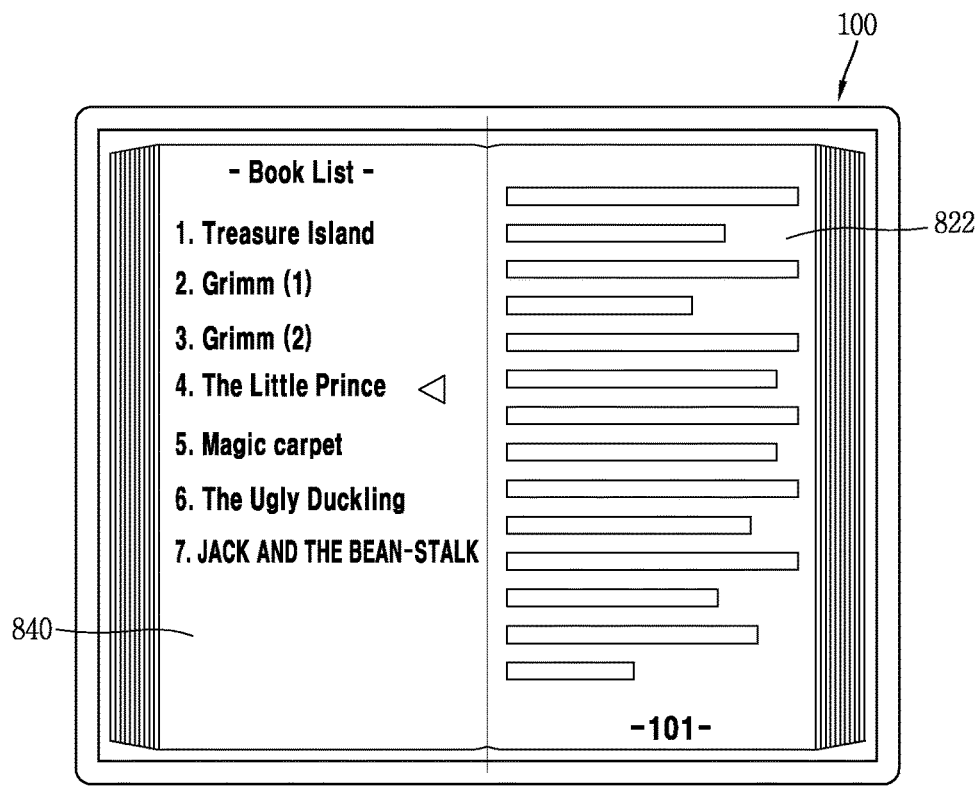
Figure 8E:
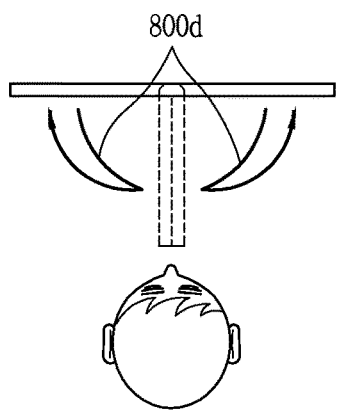

On the other hand, as illustrated in FIG. 8E, the controller 180 may sense that the display unit 151 is switched to a closed state and then switched again to an open state while displaying part of an electronic document. When an open state is switched to a closed state and then switched again to an open state within a predetermined period of time, the controller 180 may display electronic documents stored in the memory 170 or the like in at least one region of the display unit 151 in a list format 840. As a gesture of covering a book and then opening it again, it is a user's intention that does not read an electronic document being displayed. The user may select any one of electronic document items included in an electronic document list, thereby allowing a new electronic document to be displayed on the display unit 151 of the mobile terminal 100.

Furthermore, according to at least one of the embodiments of the present disclosure, when an electronic document configured with a plurality of pages or a photo album configured with a plurality of images is displayed on a flexible display unit, a user may apply an external force to the flexible display unit to be flexed, thereby turning a page being displayed on the flexible display unit to a next page or previous page. Through this, the user may have a user experience of turning sheets of a book. Furthermore, it may not be required for the user to apply an additional touch input for turning pages while holding a mobile terminal on his or her hand, thereby enhancing user convenience.

A mobile terminal according to the present disclosure may accurately measure a bending degree and a bending speed of the flexible display unit, and adjust a number of turned pages to be different based on the measured information. Accordingly, the user may more precisely control the mobile terminal, thereby accurately searching pages.

Referring to FIGS. 8A through 8E, embodiments in which the display unit is flexed inward have been described. Hereinafter, embodiments in which the display unit is flexed outward will be described in detail with reference to FIGS. 9A and 9B.

Figure 9A:
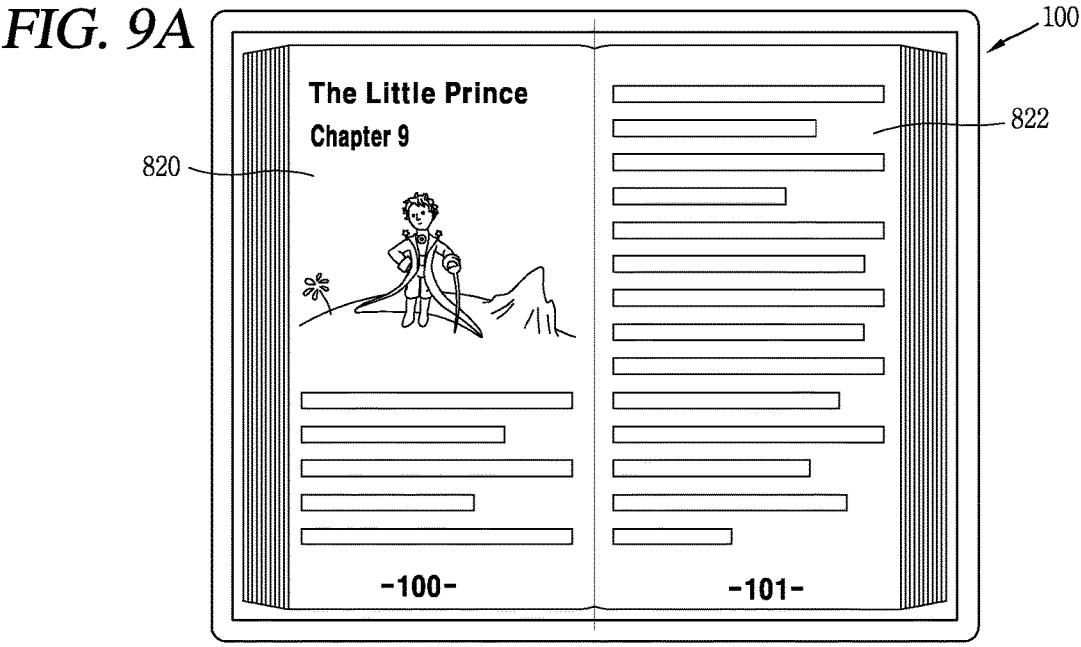
FIGS. 9A and 9B are exemplary views for explaining an operation associated with a bookmark in a mobile terminal according to an embodiment of the present disclosure.
Figure 9A:
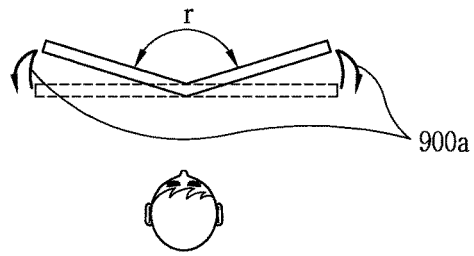
Figure 9A:
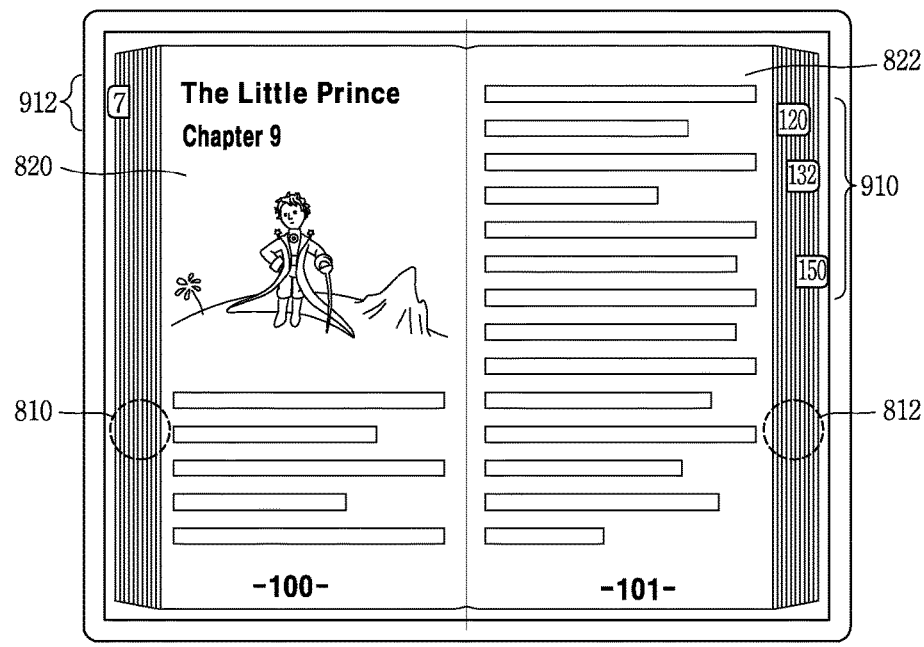
Figure 9B:
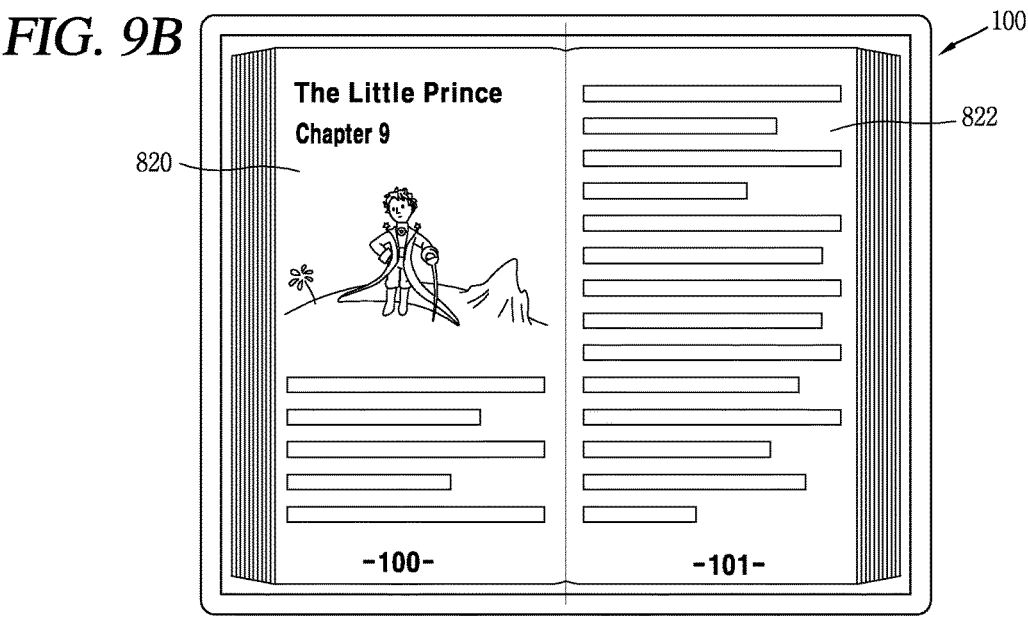
Figure 9B:
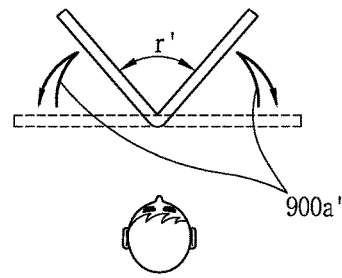
Figure 9B:
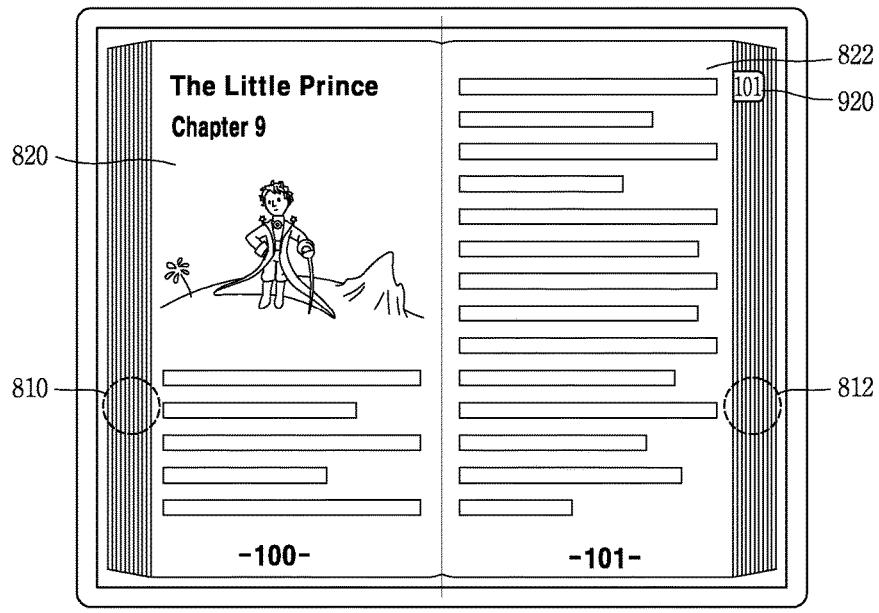

FIGS. 9A and 9B are exemplary views for explaining an operation associated with a bookmark in a mobile terminal according to an embodiment of the present disclosure.

An electronic document may include a plurality of pages, and a tag may be set to at least one the plurality of pages. The tag performs a function of bookmark that is a bookmark inserted into its pages to indicate a read portion.

When the display unit 151 is flexed outward by the movement of at least one of the left and the right end as illustrated in FIG. 9A, the controller 180 may execute a function associated with bookmark. At this time, the controller 180 may execute a different function associated with bookmark based on an included angle variation due to the flexing.

For example, as illustrated in FIG. 9A, when the included angle variation is between zero and 90 degrees (the maximum included angle is greater than 180 degrees but less than 270 degrees, 900a), a bookmark function may be carried out, and as illustrated in FIG. 9B, when the included angle variation is between 90 and 180 degrees (the maximum included angle is a predetermined angle between 270 and 360 degrees, 900a'), a bookmark set function may be carried out.

When a bookmark display function is carried out, tags 910, 920 are displayed on at least part of border lines among the border lines 810, 812. Each tag may be located at a border line of a page specified by a user or a provider of an electronic document, and have a different color visually differentiated from those of the pages 820, 822 and border lines 810, 812. For an optional embodiment, each tag may be attached to a border line of a page including a memo specified or an item highlighted by a user or a provider of an electronic document.

The tag may be configured with an image, and the image may be a bar shaped image formed in an elongated manner along a lateral surface of the terminal, and may be a different image according to the type of the tag. Here, the different image denotes an image with a different shape, length, color or the like. Information associated with tagged pages and/or information on a user who sets tags may be displayed within the image.

Though not shown in the drawing, when a touch is sensed on a first tag that is either one of the tags 910, 912, the controller 180 displays two pages including a page to which the first tag is attached on the display unit 151 while executing a graphic effect of turning pages.

On the other hand, when a user input for executing a bookmark display function is entered once again, the bookmark display function is ended, and the tags disappear from the display unit 151.

When a bookmark set function is carried out, the controller 180 sets a tag to a page being displayed on the display unit 151, and an image 920 for guiding a newly set tag in a region displayed with edges.

According to the present disclosure, a graphic object linked to a bookmark display function, a bookmark set function may not be displayed, thereby preventing the content of an electronic document from being hidden by the graphic object. Furthermore, a user may execute a bookmark display function or bookmark set function with a single operation.

Figure 10A:
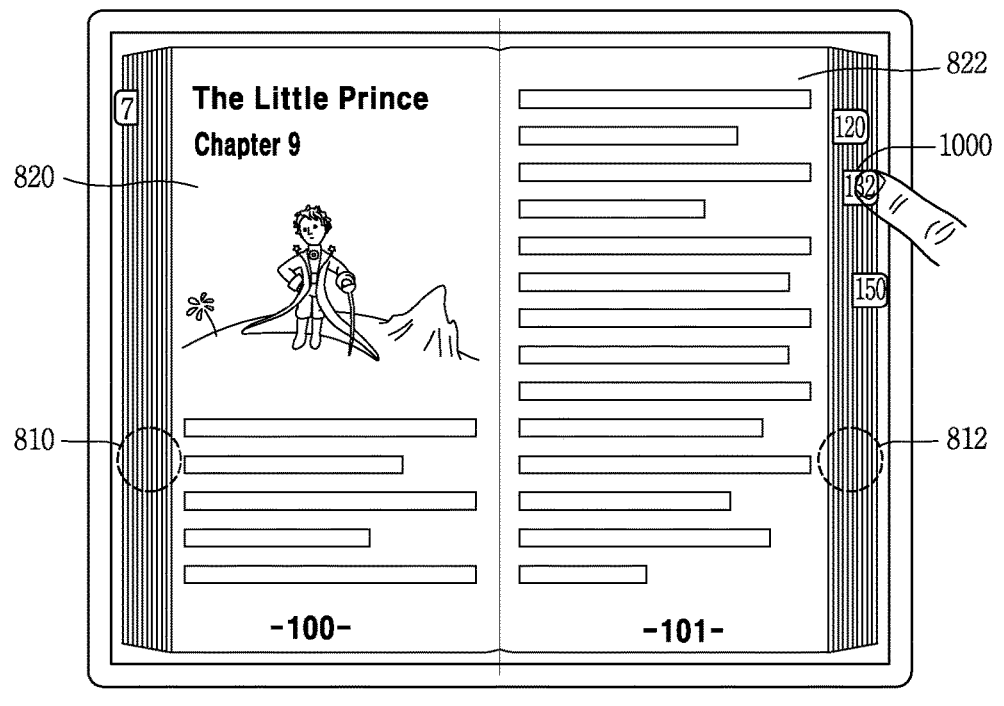
Figure 10A:
Figure 10A:
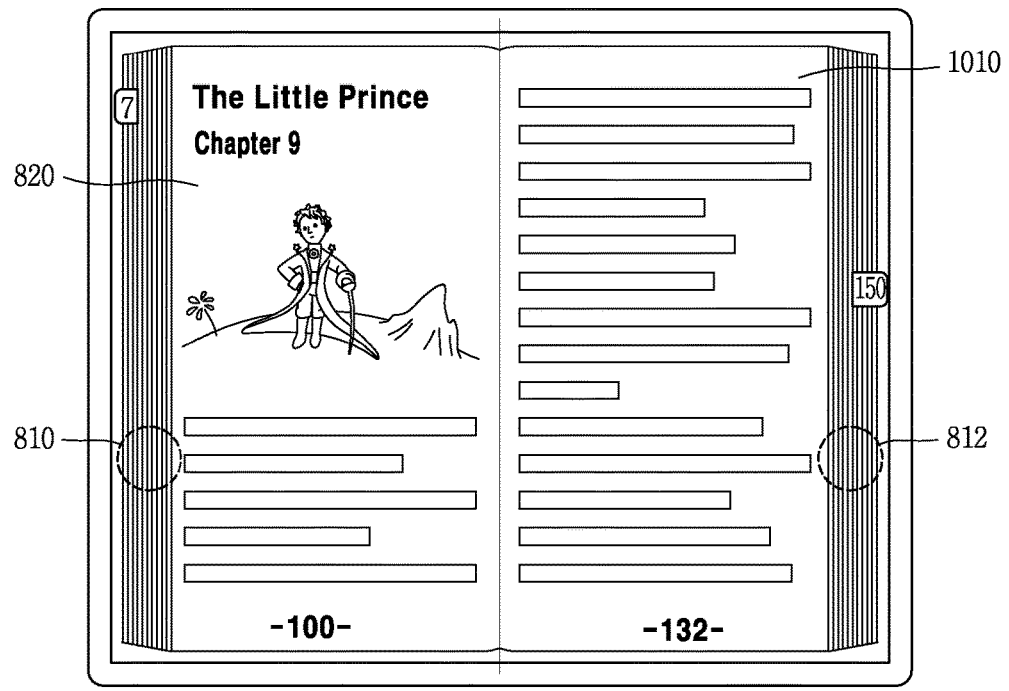

FIGS. 10A and 10B are exemplary views for explaining page movement associated with a bookmark.

Referring to FIG. 10A, a touch input may be applied to any one tag 1000 while a plurality of tags are displayed by a bookmark display function. In this case, the controller 180 may change a current page being displayed on the display unit 151 to a page corresponding to the tag 1000. For example, when a touch is applied to any one tag 1000 located at the right end while displaying a 100th page 820 and a 101st page 822, the 101st page 822 may be changed to a 132nd page 1010 corresponding to the tag 1000 to which the touch is applied. Accordingly, the 100th page 820 and 132nd page 1010 may be displayed at the same time.

When non-consecutive different pages are displayed on the display unit 151, a user may apply a user input to display consecutive pages. For example, as illustrated in FIG. 10B, when consecutive pages are desired to be displayed based on the 132nd page, a user may apply an external force to consecutively flex the right end in an inward direction and an outward direction of the display unit 151. In other words, the user may flex the display unit 151 back and forth in a state that a touch is applied to a page desired to be continuously displayed. In this case, the controller 180 controls the display unit 151 to display consecutive pages based on a page to which the touch is applied.

On the other hand, the body of the mobile terminal, namely, at least one of the display unit 151 and front case 101, may include at least one or more bending regions 210, and may be bent around an axis of the bending region 210 while at the same time being rotated (Referring to FIG. 2).

The mobile terminal 100 according to the present disclosure may perform an edit function to an electronic document based on a touch input applied to the foregoing bending region 210.

Figure 11A:
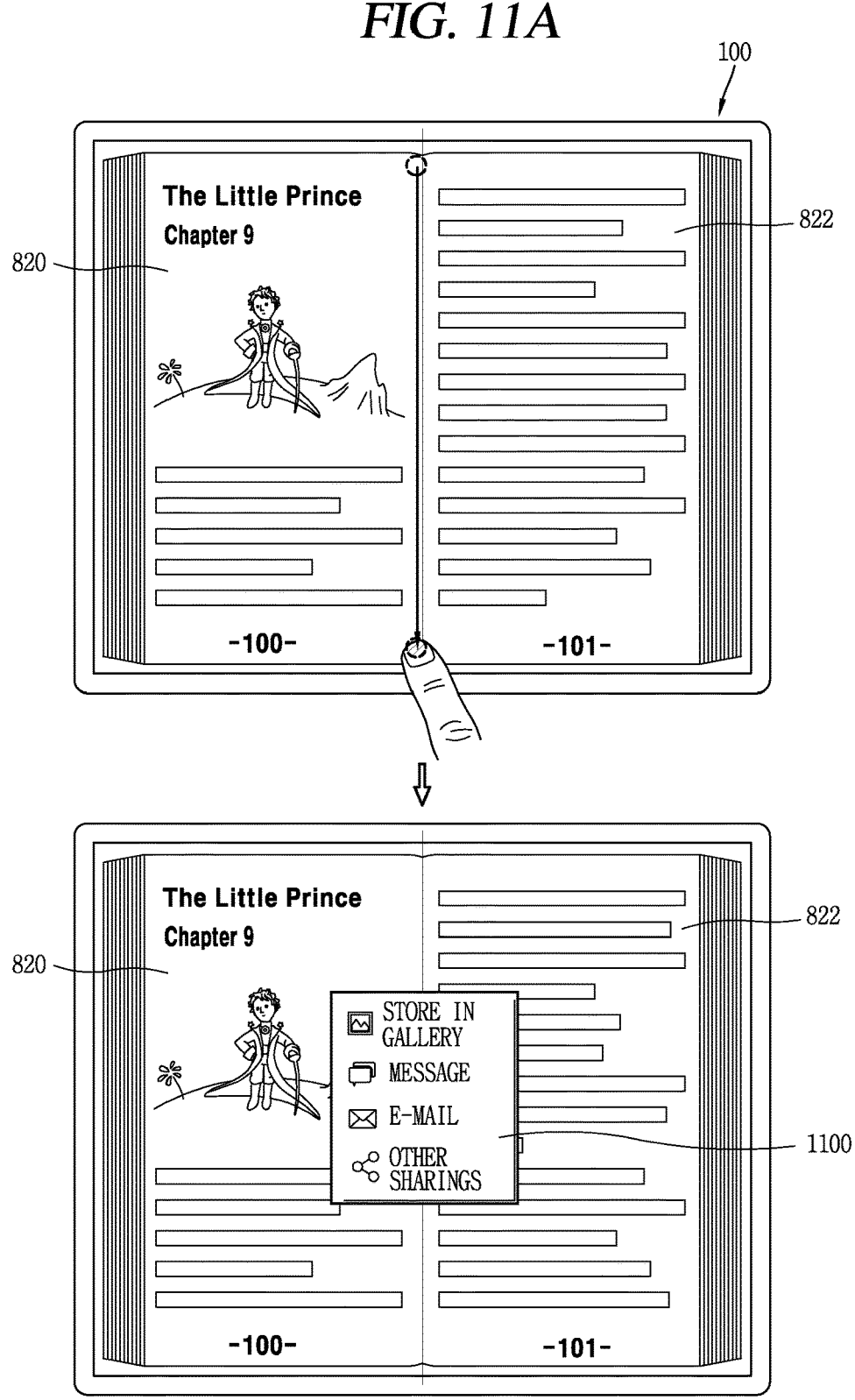
FIGS. 11A and 11B are exemplary views for explaining an operation of a mobile terminal that performs an edit function for an electronic document.
Figure 11B:
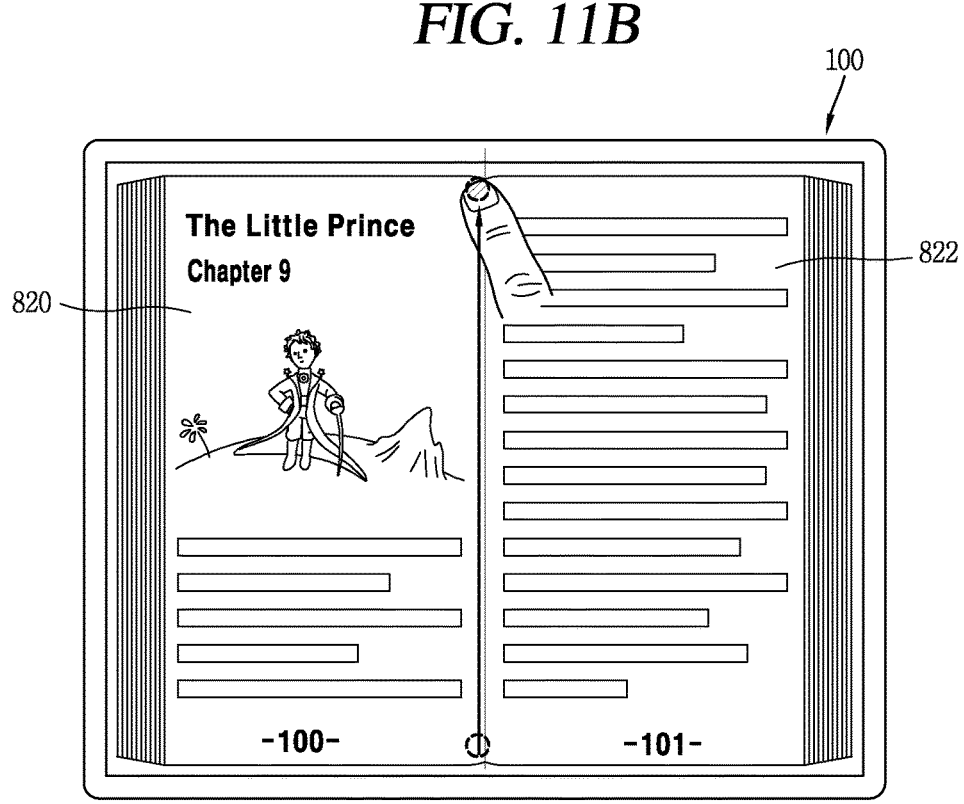
Figure 11B:
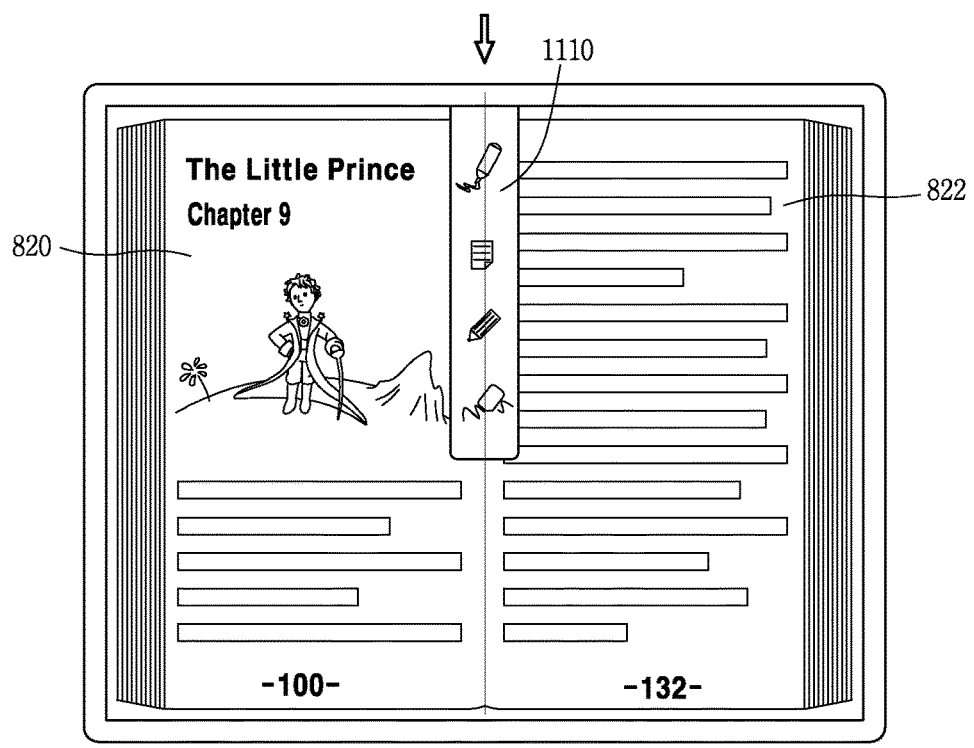

FIGS. 11A and 11B are exemplary views for explaining an operation of a mobile terminal that performs an edit function for an electronic document.

As illustrated in FIG. 11A, when a touch input consecutively moving from an upper end of the display unit 151 to a lower end thereof is applied, the controller 180 may execute a capture function to an electronic document. Moreover, the controller 180 may divide the entire region of the display unit 151 into a left region and a right region based on the touch input, and execute a capture function to the left region or the right region.

For example, when a touch input is started from an upper end and moved to a lower end, and moved again in a right direction from the lower end and released, the controller 180 divides the entire region of the display unit 151 into a left region and a right region, and executes a capture function to the right region. For another example, when a touch input is started from an upper end and moved to a lower end, and moved again in a left direction from the lower end and released, the controller 180 divides the entire region of the display unit 151 into a left region and a right region, and executes a capture function to the left region. It corresponds to a user's gesture of tearing off a sheet of book paper.

When a capture function is carried out by a touch input, menus 1100 capable of storing or sharing a captured image may be displayed.

As illustrated in FIG. 11B, when a touch input consecutively moving from a lower end of the display unit 151 to an upper end thereof is applied, the controller 180 may display an edit menu 1110 associated with an electronic document. The edit menu 1110 may include graphic objects for a font change, a memo input, a highlighter input and the like. For example, when a touch is applied to a graphic object for a highlighter input, a highlighter input function is activated. Then, when a touch consecutively moving from a first point to which the touch has been applied to a second point is sensed, the controller 180 may display a specified color image along a trajectory of the touch. The image may be formed in a transparent or semi-transparent manner, and thus part of the electronic document may be displayed in a highlighted manner.

Only when a touch input linked to a capture function or edit menu display function is applied to a bending region on the display unit 151, the capture function or edit menu function may be carried out. In general, a margin is formed at a portion connected between pages, and the bending region is included in a portion at which the margin is formed. Such a bending region may be used as a control space for executing a function associated with an electronic document, thereby enhancing user convenience. Furthermore, it may be possible to prevent a mobile terminal from malfunctioning by a user's unintentional touch.

When a graphic object linked to a control function is displayed together with an electronic document, there is a problem in which information included in the electronic document is hidden by the graphic object. However, a mobile terminal according to the present disclosure may display a graphic object on a boundary portion connected between different pages, thereby solving the foregoing problem.

As described above, a mobile terminal according to an embodiment of the present disclosure and a control method thereof, a screen displayed on a display may be easily switched using an operation of folding or unfolding a flexible display unit, and another information consistent with the use purpose may be provided according to a folding degree of the display, thereby allowing personal information to be entered without being exposed to others, for example. Furthermore, it may be possible to enter various control commands such as changing the operation state of a terminal while maintaining a current display state using an operation of folding or unfolding a flexible display unit and a touch input to a specific region.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk drive (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

The embodiments of the present disclosure have proposed a scheme capable of accurately calculating a flexing degree in a mobile terminal provided with a flexible display unit to control various functions in response to the flexing degree so as to control the functions of the mobile terminal is proposed, and thus may be applicable to various industrial fields.

What is claimed is:

1. A mobile terminal, comprising:
   a terminal body provided with a front surface, a lateral surface and a rear surface, and formed such that at least part thereof is foldable;
   a foldable display unit disposed on the front surface;
   a first sensing unit disposed at a left end of the terminal body to generate a first signal based on movement of the left end;
   a second sensing unit disposed at a right end of the terminal body to generate a second signal based on movement of the right end; and
   a controller configured to:
   cause the display unit to display at least one page of a plurality of pages constituting an electronic document;
   sense flexing of the display unit due to the movement of at least one of the left end or the right end based on at least one of the first signal or the second signal;
   select at least one page of the plurality of pages based on the sensed flexing;
   cause the display unit to display the selected at least one page;
   determine a bending region formed by the flexing of the display unit;
   divide the display unit into a first portion and a second portion based on the bending region, wherein at least one of positions or sizes of the first and second portions is varied according to a position where the bending region is formed;
   cause the display unit to display a first page of the plurality of pages on the first portion and a second page of the plurality of pages on the second portion; and
   selectively capture the first page or second page in response to a predetermined touch input applied to the bending region, the first page displayed on first portion captured in response to a first-type of the predetermined touch input and the second page displayed on the second portion captured in response to a second-type of the predetermined touch input.

2. The mobile terminal of claim 1, wherein the controller selects a different page based on an included angle formed by the first and the second portion in selecting at least one page among the plurality of pages.

3. The mobile terminal of claim 2, wherein when the display unit is flexed inward by relatively moving the right end with respect to the left end while displaying an n-th page among the plurality of pages, the controller sets "t" based on the included angle, and controls the display unit to display an (n+t)th page instead of the n-th page, wherein the "n" and the "t" are natural numbers, and the "t" varies according to the included angle.

4. The mobile terminal of claim 3, wherein when the display unit is flexed inward by relatively moving the left end with respect to the right end while displaying the n-th page, the controller controls the display unit to display an (n−t)th page instead of the n-th page.

5. The mobile terminal of claim 1, wherein when a preset touch input is applied to the display unit while the flexing is sensed, the controller restricts the selected page from being displayed.

6. The mobile terminal of claim 1, wherein when the display unit is flexed inward by relatively moving the right end with respect to the left end, the controller displays a subsequent next page in replacement of a current page being displayed to carry out page movement.

7. The mobile terminal of claim 6, wherein the controller consecutively performs the page movement while the flexing is maintained.

8. The mobile terminal of claim 7, wherein a speed of carrying out the page movement varies according to an included angle formed by the first portion and the second portion.

9. The mobile terminal of claim 7, wherein when the display unit is switched to a flat plane while carrying out the page movement by the flexing, the controller stops the page movement.

10. The mobile terminal of claim 6, wherein when the display unit is flexed outward by the movement of the right and the left end, the controller sets a bookmark for the current page.

11. The mobile terminal of claim 10, wherein when the bookmark is set, the controller displays a bar-shaped image formed in an elongated manner along a lateral surface of the terminal body on an edge of the current page, and displays information associated with a page to which the bookmark is set on the image.

12. The mobile terminal of claim 1, wherein when the first portion and the second portion overlap with each other, the controller ends the output of the at least one page, and switches the display unit from an ON state to an OFF state.

13. The mobile terminal of claim 12, wherein a first geomagnetic sensor and a second geomagnetic sensor configured to sense whether or not the first portion and the second portion overlap with each other, and
the first and the second geomagnetic sensor are disposed at the left and the right end, respectively.

14. A control method of a mobile terminal, the method comprising:
controlling a display unit to display at least one page among a plurality of pages constituting an electronic document;
sensing flexing of the display unit due to movement of at least one of a left end or a right end of the display unit, wherein the flexing of the display unit is sensed by at least one of a first signal generated from a first sensing unit disposed at the left end or a second signal generated from a second sensing unit disposed at the right end;
selecting at least one page of the plurality of pages based on the sensed flexing;
displaying the selected at least one page on the display unit;
determining a bending region formed by the flexing of the display unit;
dividing the display unit into a first portion and a second portion based on the bending region, wherein at least one of positions or sizes of the first and second portions is varied according to a position where the bending region is formed;
displaying a first page of the plurality of pages on the first portion and a second page of the plurality of pages on the second portion; and
selectively capturing the first page or second page in response to a predetermined touch input applied to the bending region, the first page displayed on first portion captured in response to a first-type of the predetermined touch input and the second page displayed on the second portion captured in response to a second-type of the predetermined touch input.

15. The method of claim 14, wherein the second portion is formed in a rotatable manner with respect to one boundary portion formed at one side of the first portion to be in either one of a state that covers the first portion and a state that does not cover the first portion, and
wherein displaying the selected page comprises:
measuring an included angle formed by the first portion and the second portion;
setting "t" based on the included angle; and
controlling the display unit to display an (n+t)th page instead of an n-th page being displayed, wherein the "n" and the "t" are natural numbers, and the "t" varies according to the included angle.

16. The method of claim 15, further comprising:
ending the output of the at least one page, and switching the display unit from an ON state to an OFF state when the first portion and the second portion overlap with each other.

17. The method of claim 14, wherein displaying the selected page comprises:
displaying a subsequent next page in replacement of a current page being displayed to carry out page movement when the display unit is flexed inward by relatively moving the right end with respect to the left end.

18. The method of claim 17, further comprising:
consecutively performing the page movement while the flexing is maintained.

19. The method of claim 18, wherein a speed of carrying out the page movement varies according to an included angle formed by the first portion and the second portion.

20. The method of claim 19, further comprising:
stopping the page movement when the display unit is switched to a flat plane while carrying out the page movement by the flexing.

* * * * *